US 6,718,014 B2

(12) United States Patent
Haim

(10) Patent No.: US 6,718,014 B2
(45) Date of Patent: Apr. 6, 2004

(54) DISCRETE STRESS-REDUCING HUMAN-TELECOMMUNICATIONS INTERFACE

(76) Inventor: Albert M. Haim, 10844 Pleasant Hill Dr., Potomac, MD (US) 20854

( * ) Notice: Subject to any disclaimer, the term of this patent is extended or adjusted under 35 U.S.C. 154(b) by 410 days.

(21) Appl. No.: 09/746,003

(22) Filed: Dec. 26, 2000

(65) Prior Publication Data

US 2002/0015478 A1 Feb. 7, 2002

Related U.S. Application Data

(60) Provisional application No. 60/171,652, filed on Dec. 27, 1999.

(51) Int. Cl.[7] ................................................ H04M 1/64
(52) U.S. Cl. ............................ 379/88.15; 379/88.23
(58) Field of Search ....................... 379/67.1, 70, 88.11, 379/88.12, 88.14, 88.15–88.16, 88.22, 88.23; 455/412, 413, 414, 415, 417; 340/7.2, 7.29, 7.51, 7.53, 7.58

(56) References Cited

U.S. PATENT DOCUMENTS

| | | | | |
|---|---|---|---|---|
| 5,327,486 A | * | 7/1994 | Wolff et al. ............... 379/93.23 |
| 5,355,406 A | | 10/1994 | Chencinski et al. .......... 379/88 |
| 5,388,150 A | * | 2/1995 | Schneyer et al. ......... 379/88.19 |
| 5,440,616 A | | 8/1995 | Harrington et al. ........... 379/88 |
| 5,452,341 A | | 9/1995 | Sattar ........................... 379/88 |
| 5,502,761 A | | 3/1996 | Duncan et al. .............. 379/142 |
| 5,535,262 A | | 7/1996 | Kanzawa ..................... 379/67 |
| 5,550,900 A | * | 8/1996 | Ensor et al. ............... 379/88.11 |
| 5,559,867 A | | 9/1996 | Langsenkamp et al. ....... 379/69 |
| 5,623,537 A | * | 4/1997 | Ensor et al. ................ 379/88.2 |
| 5,644,629 A | | 7/1997 | Chow ........................... 379/142 |
| 5,754,636 A | | 5/1998 | Bayless et al. ............. 379/142 |
| 5,799,072 A | | 8/1998 | Vulcan et al. ............... 379/114 |
| 5,815,566 A | | 9/1998 | Ramot et al. ................ 379/265 |
| 5,818,910 A | | 10/1998 | De Thouars et al. ......... 379/89 |
| 5,848,362 A | * | 12/1998 | Yamashita .................. 455/567 |
| 5,870,465 A | | 2/1999 | Hosbach et al. ............. 379/419 |
| 5,878,117 A | | 3/1999 | Minakami et al. ........ 379/88.01 |
| 5,889,845 A | | 3/1999 | Staples et al. .............. 379/211 |
| 5,978,451 A | * | 11/1999 | Swan et al. ............... 379/88.24 |
| 5,991,367 A | * | 11/1999 | Robuck .................... 379/88.24 |
| 6,118,979 A | * | 9/2000 | Powell ........................ 340/7.6 |
| 6,188,916 B1 | * | 2/2001 | Noda et al. .................. 455/567 |
| 6,263,218 B1 | * | 7/2001 | Kita ............................ 455/567 |
| 6,377,823 B1 | * | 4/2002 | Higuchi et al. .............. 455/567 |

FOREIGN PATENT DOCUMENTS

| | | | |
|---|---|---|---|
| EP | 0 480 634 | 4/1992 | ........... H04Q/11/04 |
| EP | 0 740 482 | 10/1996 | ............. H04Q/7/32 |
| JP | 4-156754 | 5/1992 | ............ H04M/3/42 |
| WO | WO9427394 | * 11/1994 | |
| WO | WO 94/29992 | 12/1994 | ............ H04M/3/38 |

* cited by examiner

Primary Examiner—Scott L. Weaver
(74) Attorney, Agent, or Firm—Carlos R. Villamar; Anderson I. Chen

(57) ABSTRACT

A telecommunication interface provides a user or recipient with the capability of a reduced-stressed environment. In particular, the telecommunication interface is interfaced with a telephone system at a call recipient location. The telecommunication interface may be configured to detect an incoming telephone call. The telecommunication interface intercepts the incoming telephone call prior to the ringing and presents the caller with a menu of several options to contact the users at the call recipient location. The telecommunication interface may be configured to place the caller on hold and to send a message to a portable notifier carried by the specific user in response to a selection of the user by the caller. The portable notifier vibrates or visually cues the user of an incoming telephone call or message. The portable notifier may display answering options for the specific user. The answering options may include forwarding the telephone call to a voice mailbox of the user or playing a pre-recorded message that the specific user will be answering the telephone call.

21 Claims, 17 Drawing Sheets

DISCRETE STRESS-REDUCING HUMAN-TELECOMMUNICATIONS INTERFACE

This application claims priority of provisional patent application No. 60/171,692 filed Dec. 27, 1999.

FIELD OF THE INVENTION

This invention relates generally to the field of telephone systems. In particular, a system and method for improving the quality of life for telephone users by providing a real-time screening of a telephone call without the ringing of the telephone call.

BACKGROUND OF THE INVENTION

In today's modern society, telephones have become an ubiquitous part of daily life. Telephones, especially land-line telephones, provide a convenient and inexpensive method of reaching users at work and/or home.

However, a telephone may also become burdensome. For example, in a typical family of four with older children, a parent may answer multiple telephone calls a night without having a single telephone call directed to the parent. For the parent, this may become tiresome and aggravating, having to hear the ringing and answering of multiple telephone calls.

Moreover, if one of the members of the family is conducting a home-based business, there may be multiple telephone calls into the home during the time when the family is attempting to gather for a meal or to unite for a family activity. The interruption of the multiple telephone calls may distract and/or annoy the other members of the family.

To avoid the above-mentioned interruptions, several solutions have been commercially available to telephone users. First, a telephone answering device ("TAD") has been touted as a possible method to screen unwanted telephone calls. The TAD is a device that answers a telephone call after a certain number of rings and plays back an out-going message to inform the caller to leave a voice-message at the end of the out-going message. The TAD is configured to provide a memory to save the voice-message of the caller.

The TAD may be also used as a caller screen or filter. In general, telephone callers who are telemarketers or solicitors do not leave telephone messages upon hearing the outgoing-message of the TAD. Moreover, during the recording of the message, the call recipient may answer the telephone call and discontinue the message recording upon identification of the caller. Thus, the TAD may be used to filter or screen telephone calls.

However, TAD still does not resolve the problem of hearing the incoming multiple telephone calls. In order for the TAD to function as a call filter, the TAD must wait for the programmed number of rings before initiating operation. Thus, the call recipient or user is still interrupted or disturbed by the ringing of the incoming telephone call. Moreover, if the call recipient decides to answer a telephone call after screening the telephone call, the call recipient has to be near the TAD to discontinue the recording of the voice message. Accordingly, the TAD may not be an ideal remedy for the above-mentioned problems.

Another solution that has been offered to the above-mentioned problems is caller identification ("ID"). Caller ID is typically a service provided by user's telephone company. With this service, a recipient may be provided with information such as the name, area code, telephone number, and address of the caller which is encoded and sent with the telephone call. To utilize this service, the recipient typically has a caller ID device interfaced with the recipient telephone line to decode the encoded caller ID information. During an incoming telephone call, the caller ID information is displayed on the caller ID device, thus, giving the recipient the choice to answer the incoming telephone call if the recipient recognizes the caller ID information.

Although caller ID may be an effective filter for screening incoming telephone calls, the recipient is still disturbed by the ringing of the telephone call. Moreover, the recipient has to be near the caller ID device to determine whether to answer the incoming telephone call.

Yet another solution that has been offered to the above-mentioned problems is call forwarding. Call forwarding is a method where an incoming telephone call to a first telephone number is redirected to a second telephone number. Call forwarding is usually initiated by the recipient of the first telephone number. With this technique, incoming telephone calls may be redirected to where the recipient is located.

However, call forwarding does not appear to offer any call filtering or screening capability. When a recipient initiates call forwarding, all the telephone calls directed to the original telephone number are sent to the new telephone number. The above-mentioned problems of hearing the ringing of incoming telephones and interruptions by incoming telephone calls are still present at the new telephone number.

SUMMARY OF THE INVENTION

In accordance with the principles of the present invention, a system for providing a stress-free environment where the system includes a telecommunication interface configured for receiving an incoming telephone call for a user and a portable notifier configured to interface with the telecommunication interface. The telecommunication interface is further configured to notify the user of said incoming telephone call on the portable notifier in response to the telecommunication interface intercepting the incoming telephone call prior to ringing of the incoming telephone call.

In accordance with another aspect of the principles of the present invention, an exemplary embodiment of a multimedia relay for transferring information is disclosed. The multimedia relay includes a wireless transceiver configured to interface with a telecommunication interface and at least one device interface configured to interface with a device. The multimedia relay also includes a controller configured to transfer information between the device and the telecommunication interface through the wireless transceiver.

In accordance with yet another aspect of the principles of the present invention, an exemplary method of providing a stress-free environment is disclosed. The method includes intercepting an incoming telephone call for a user prior to ringing of the incoming telephone call by a telecommunication interface and sending a notification message to the user through a wireless transceiver of the telecommunication interface. The method further includes indicating to the user of the incoming telephone in response to the notification message.

BRIEF DESCRIPTION OF THE DRAWINGS

Features and advantages of the present invention will become apparent to those skilled in the art from the following description with reference to the drawings, in which.

DETAILED DESCRIPTION OF PREFERRED EMBODIMENTS

Figure 1:
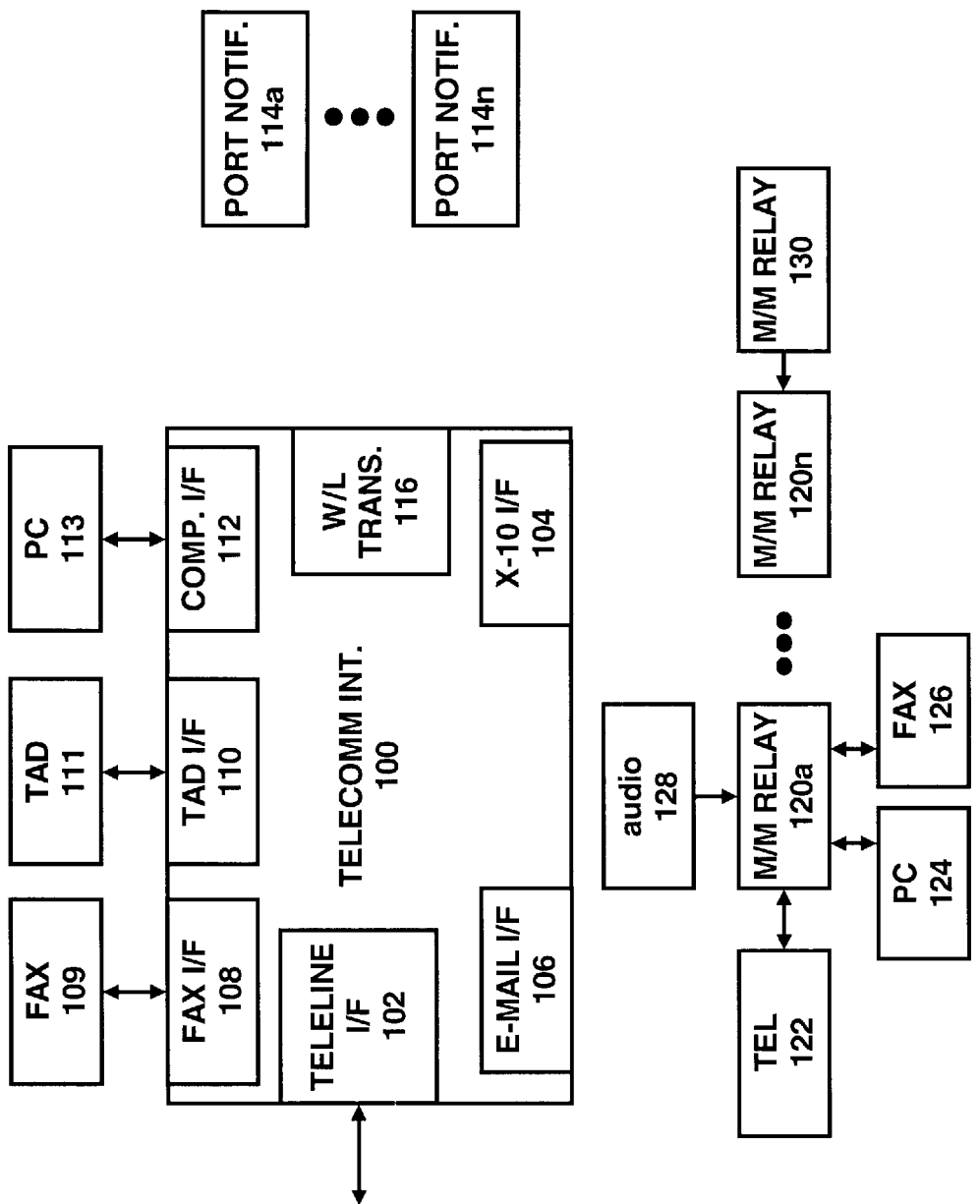
FIG. 1 shows an exemplary embodiment of a telecommunications interface in accordance with the principles of the present invention.

For simplicity and illustrative purposes, the principles of the present invention are described by referring mainly to an exemplary embodiment thereof. However, one of ordinary skill in the art would readily recognize that the same principles are equally applicable to and can be implemented in any other embodiments without departing from the true spirit and scope of the principles of the present invention.

In accordance with the principles of the present invention, a telecommunication interface provides a user or a call recipient with a reduced-stressed environment. In particular, the telecommunication interface is interfaced with a telephone system at a call recipient location. The telecommunication interface may be configured to detect an incoming telephone call. The telecommunication interface intercepts the incoming telephone call prior to the ringing and presents the caller with a menu of several ways in which to contact the user at the call recipient location.

If the caller selects a voice message option, the telecommunication interface may be configured to play an outgoing message to inform the caller to leave a voice message. The telecommunication interface may be provided with memory, e.g., tape, digital memory, etc., to store voice messages.

If the caller selects the facsimile message option, the telecommunication interface may be further configured to direct the telephone call to an electronic message box to store the incoming facsimile message. Alternatively, if an external facsimile machine is interfaced with the telecommunication interface, the telecommunication interface may be configured to redirect the incoming facsimile message for processing by the interfaced external facsimile machine.

If the caller selects the telephone answering device ("TAD") message option, the telecommunication interface may be further configured to direct the telephone call to a voice-message box to store the incoming telephone message. Alternatively, if an external TAD machine is interfaced with the telecommunication interface, the telecommunication interface may be configured to redirect the incoming telephone call for processing by the interfaced external TAD machine.

If the caller selects contacting the specific recipient, the telecommunication interface may be configured to place the caller on hold and to send a wireless message to the specific recipient. The specific recipient may carry a portable notifier that may be configured to alert the specific recipient in response to the receipt of the wireless message. The portable notifier may be further configured to display the wireless message informing the specific recipient of the telephone call and the caller identification information of the caller. The portable notifier may also present the user the option of answering the telephone call or giving the specific recipient to send the caller to voice-mail. Accordingly, a caller may directly contact a specific recipient without disturbing the other users of a home, thereby maintaining a quiet and stress-free environment.

If the specific recipient decides to answer the telephone call, the specific recipient may locate the telephone receiver and begin the telephone conversation with the caller. If, on the other hand, the specific recipient may decide to send the caller to voice-mail, the specific recipient activates the voice-mail option on the portable notifier. The telecommunication interface may be further configured to take the caller off 'HOLD' and play an outgoing message to inform the caller to leave a voice message in response to the specific recipient's activation of the voice mail option. Accordingly, a recipient may be notified of an incoming telephone call with the option of answering the incoming telephone call without the ringing hence providing a reduced-stress environment.

The telecommunication interface may be further configured to notify a recipient or user of a received electronic message. The telecommunication interface may include a electronic mail ("e-mail") or instant messaging interface configured to access an Internet account of the user and retrieve any electronic mail direct to the user. The e-mail interface may be further configured to inform the telecommunication interface to notify the user of the received electronic mail for the user.

The telecommunication interface may be further configured to transfer information between itself and multimedia relays which will be described in more detail herein below. The multimedia relay may be configured to interface with the telecommunication interface utilizing a wireless transfer protocol, e.g., radio-frequency, Bluetooth, infra-red, etc., to transfer information such as data and/or commands. The multimedia relay may also be configured to transfer information between the multimedia relays in the same manner as between a multimedia relay and the telecommunication interface.

The multimedia relay may be further configured to interface with a variety of electronic devices such as computers, audio/video ("A/V") equipment, computer peripherals, input devices, facsimile machines, etc. Accordingly, a user may utilize the multimedia relay in one location to transfer information between the multimedia relay and the telecommunication interface located in another distant location. Alternatively, two multimedia relays located in different locations may transfer information among themselves through the telecommunication interface.

FIG. 1 shows an exemplary embodiment of the telecommunication interface 100 in accordance with the principles of the present invention. The telecommunication interface 100 may be configured to interface with a telephone line at a telephone line interface 102. The telephone line interface 102 may be compatible with a public switched telephone network ("PSTN"), a integrated services digital network ("ISDN"), a wireless communication network or the like. The telecommunication interface 100 may also be configured to include an X-10 interface 104 to provide remote control via telephone of X-10 enabled appliances. The X-10 protocol is a communication standard for home automation, and is well known to those familiar with home automation. An electronic mail interface 106 of the telecommunication interface 100 may be configured to receive electronic mail for designated users.

The telecommunication interface 100 may be further configured to interface with other household devices. In this embodiment, telecommunication interface 100 may be configured with a facsimile machine interface 108 configured to interface with an external facsimile machine 109; a telephone answering device ("TAD") interface 110 configured to interface with a TAD 111; and a computer interface 112 configured to interface with a computer 113.

The telecommunication interface 100 may be further configured to interface with portable notifiers 114a . . . 114n through a wireless transceiver 116 of the telecommunication interface 100. The wireless transceiver 116 may be configured to transmit and receive data and/or commands using a wireless transmission protocol. The wireless transmission protocol may include radio frequency ("RF"), infra-red, optical, Bluetooth, etc.

Each portable notifier 114a . . . 114n may be carried by a user of the telecommunication interface 100. Each portable notifier 114a . . . 114n may be configured to notify a user of an incoming telephone call directed for the user. In particular, an incoming telephone call is received at the telephone line interface 102 and is answered by the telecommunication interface 100 before ringing. The caller is presented with a series of options that include paging or notifying a user of the telecommunication interface 100. The telecommunication interface 100 may be configured to place the caller on hold and to send a message to a portable notifier 114a . . . 114n carried by the call recipient through a wireless interface 116 of the telecommunication interface 100 in response to a selection by the caller of paging the call recipient. The portable notifier 114a may vibrate and/or visually cue the user of an incoming telephone call or message. The portable notifier 114a may display answering options for the specific user. The answering options may include forwarding the telephone call to a electronic mailbox of the user or playing a pre-recorded message that the specific user will be answering the telephone call. According to the disclosed embodiment, a telecommunication interface provides users with a ring-free environment while providing the users the option of directly answering incoming telephone calls, thereby a stress-free environment.

The telecommunication interface 100 may be further interfaced with multimedia relays 120a . . . 120n. Each multimedia relay, 120a . . . 120n, may be configured to provide an interface for the transfer of data and/or commands for a variety of devices, e.g., facsimile machines, personal computers, telephones, audio/video equipment, etc.

Each multimedia relay, 120a . . . 120n, may provide the capability of transferring a variety of data such as audio, video, telecommunication, etc. Each multimedia relay, 120a . . . 120n, may be further configured to provide remote transfer of data/command between devices interfaced with each multimedia relay, 120a . . . 120n, and the telecommunication interface 100. Each multimedia relay, 120a . . . 120n, may be further configured to exchange data/commands with other ones of the multimedia relays, 120a . . . 120n.

For instance, multimedia relay 120 is shown in FIG. 1 interfaced with a telephone 122, a personal computer 124, a facsimile machine 126, and an audio equipment 128. As shown in FIG. 1, a user may transfer a computer file from personal computer 124 through the multimedia relay 120 to the computer 113 interfaced with telecommunication interface 100 or to another remote computer interfaced through the telephone interface 102 of the telecommunication interface 100. Alternatively, a user may transfer audio from an audio equipment 128 to another multimedia relay, e.g., 120n, for playback of the transferred audio in audio equipment 130 interfaced with multimedia relay 120n.

In a preferred embodiment, the transfer of data and/or commands between the telecommunications and the multimedia relays 120a . . . 120n and among the multimedia relays 120a . . . 120n may be implemented utilizing wireless protocols, e.g., RF, optical, Bluetooth, etc. Alternatively, the transfer of data and/or commands may be implemented utilizing power lines or telephone lines.

Figure 2:
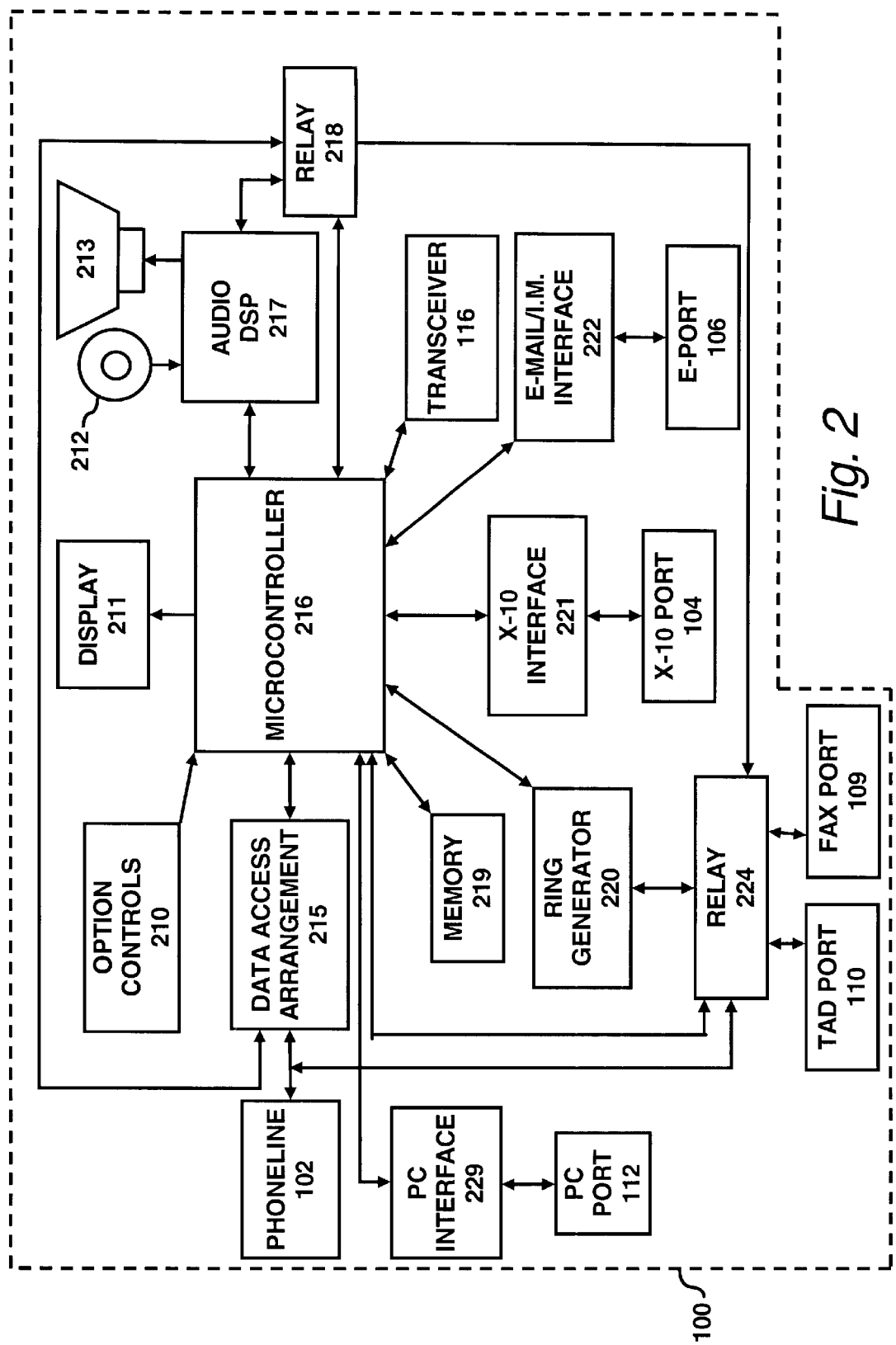
FIG. 2 illustrates a more detailed block diagram of the telecommunications interface of FIG. 1.

FIG. 2 illustrates a more detailed block diagram of an embodiment of the telecommunication interface 100 shown in FIG. 1. In particular, the telecommunication interface 100 may be configured to be interfaced in parallel through a phone-line port 102 to a PSTN or a private telephone network. The phone-line port 102 may be interfaced with a Data Access Arrangement 215 of the telecommunication interface 100, which may be configured to ensure the telecommunication interface complies with Federal Communications Commission ("FCC") regulations and to provide an interface for a micro-controller 216. The micro-controller 216 may be a microprocessor, an application specific integrated circuit ("ASIC") or the like.

The micro-controller 216 may be interfaced with an audio digital signal processor ("DSP") 217, such as the AT&T MICROELECTRONIC DSP32000TM DSP and the like. The DSP 217 may be configured to provide generic telephony DSP as well as provide synthesized audio capability, voice recording capability, dual-tone multi-frequency ("DTMF") detection and decoding, and a line sensor to detect an "OFF-HOOK" condition.

The DSP 217 may be further interfaced with a relay 218. The relay 218 may be configured to interface the audio DSP 217 to the telephone network through the phone-line port 102 or to interface the data access arrangement 215 with a relay 224. In this embodiment, the interface between relay 218 and relay 224 may be represented by a double stranded FCC compliant telephone signal carrier. The relay 224 may be further interfaced with a ring generator 220, which may be interfaced to the micro-controller 216. The ring generator 220 may be configured to activate a telephone answering device (not shown) through a TAD port 110 or a facsimile machine (not shown) through a fax port 109.

Alternatively, the functionality of the DSP 217 may be implemented by the micro-controller 216 if a processing platform is selected that can perform both the micro-controller 216 and DSP 217 functions within the performance specifications of the telecommunications interface 100. The DSP 217 may be further configured to provide speech recognition algorithms to provide the capability of speech recognition for the telecommunication interface 100.

The relay 224 may be further configured to interface the phone-line port with either the TAD port 110 or the FAX port 109. The relay 224 may be further configured to interface relay 18 with either TAD port 110 or FAX port 109. Relay 224 may be a complex, series of simple relays, or an ASIC configured to implement the aforementioned interfaces.

The micro-controller 216 may be further interfaced with a memory 219. The memory 219 may be configured to provide storage of user options, data, and the like for the telecommunication interface 100. The memory 219 may be a static random access memory, a flash memory or the like.

In this embodiment, an X-10 interface 221 may also be interfaced to both the micro-controller 216 and an X-10 port 104. The X-10 port 104 may be configured to be either a power port or a transmitter plug-in port. Since the X-10 protocol is an emerging standard for home automation products, the X-10 interface 104 provides the capability to the telecommunication interface 100 of being utilized as a controller for X-10 enabled appliances. Similarly, other types of protocols or interfaces for controlling appliances may be utilized.

The telecommunication interface 100 may also provide to users the capability of electronic mail ("e-mail"). In particular, an electronic port ("e-port") 106 may be provided to interface with an electronic mail provider. In this embodiment, the e-port 106 may be connected to either a telephone line of the phone-line port 102 or to another telephone line of the user. The e-port 106 may be further interfaced with an e-mail, or instant messaging, interface 222. The e-mail interface 222 may be configured to receive an incoming electronic messages, e.g., e-mail, instant messaging, etc., for the micro-controller 216 to store the incoming electronic message in the memory 219. The e-mail interface 222 may include a modem (not shown) Alternatively, the e-mail interface 222 may be configured with additional memory to store incoming electronic messages locally in the e-mail interface 222.

The telecommunication interface 100 may further provide a personal computer ("PC") interface 229. The PC interface 229 may be configured to provide an interface for an exchange of information between the telecommunication interface 100 and a personal computer (not shown). The personal computer may be interfaced with the telecommunication interface 100 through the computer interface 112, as shown in FIG. 1.

The portable notifiers 114a . . . 114n may interface with the telecommunications interface 100 with a transceiver 116. The transceiver 116 may be configured to interface with the DSP 217, the X-10 interface 221, the e-mail interface 222, the TAD port 110, the FAX port 109, the memory 219 and the data access arrangement 215 through the micro-controller 216.

The users of the telecommunications interface 100 may interact with the telecommunications interface 100 with a variety of user interfaces that may include an option controls 210, a display 211, a microphone 212, and a speaker 213. The display 211 may be configured to show users of the telecommunications interface 100 menu options, selected items, electronic messages, and the like. The microphone 212 may be configured to provide a user the capability to input an outgoing message. The speaker 213 may be configured to output recorded messages, outgoing messages, and the like.

The option controls 210 may be configured to control the settings of the various functions in the preferred embodiment of the present invention. These various functions include, but are not limited to: FAXANS $1^{st}$, FAXANS, FAXINT, TADANS $1^{st}$, TADANS, TADINT, EMAIL, PAGEALL, CALLSCREEN, RECORD outgoing voice message (O.V.M.), PLAY O.V.M., TURNON PAGER #XX, TURNOFF PAGER #XX, GETMESSAGE, TIME EXTENSION, X-10 MODULE#XX, ASSOCIATE CALLER, ADD NEW #, SCREEN, ACCEPT, ADD CALLER, ADD NEW NAME, and LINE TAG A–Z.

The FAXANS $1^{st}$ option may configure the telecommunications interface 100 to respond to any incoming telephone calls as an incoming facsimile telephone call and direct the incoming telephone call to a facsimile processing portion of the telecommunications interface 100 when set.

The FAXANS option may configure the telecommunications interface 100 to provide the capability for a caller to direct the incoming telephone call to a facsimile machine (not shown) interfaced at the fax port 109 when set. The FAXANS option may configure the telecommunication interface 100 not to provide the capability of prompting a caller to direct an incoming telephone call to a facsimile machine (not shown) interfaced at the fax port 109 when not set.

The FAXINT option may notify the telecommunications interface 100 that an internal facsimile machine has been provided with the telecommunication interface 100 when set. The internal facsimile machine may be implemented as hardware or may be implemented as a software application executed by the controller 216.

The TADANS $1^{st}$ option may configure the telecommunications interface 100 to respond to any incoming telephone calls as an incoming telephone call and to direct the incoming telephone call to the TAD processing of the telecommunications interface 100 when set.

The TADANS option may configure the telecommunications interface 100 to provide the capability of prompting a caller to direct an incoming telephone call to a TAD (not shown) interfaced at the fax port 109 when set. Conversely, the TADANS option may configure the telecommunications interface 100 not to provide the capability of prompting a caller to direct an incoming telephone call to a facsimile machine (not shown) interfaced at the fax port 109, when not set.

The TADINT option may notify the telecommunications interface 100 that an internal TAD has been provided with the telecommunication interface 100 when set. The internal TAD may be implemented as hardware or may be implemented as a software application executed by the controller 216.

The EMAIL option may configure the telecommunication interface 100 to utilize the e-mail interface 222 to retrieve electronic messages from an Internet account of a specific user when set.

The PAGEALL option may configure the telecommunications interface 100 to signal all the portable notifiers 114a . . . 114n simultaneously in response to a paging even when set.

The CALLSCREEN option may configure the telecommunications interface 100 to invoke the call screening module, which may be configured to screen incoming telephone calls when set. The CALLSCREEN option may configure the telecommunications interface 100 not to invoke the call screening module when not set.

The CALLSCREEN option may configure the telecommunications interface 100 to prompt a user to a subset of options such as ASSOCIATE CALLER, ADD NEW #, SCREEN, ACCEPT, ADD CALLER, and ADD NEW NAME. The ASSOCIATE CALLER option, when set, may configure the telecommunications interface 100 to provide the capability of associating an incoming caller's voice with a telephone number. The ADD NEW # option, when set, may provide the telecommunications interface 100 the capability of adding additional numbers that may be eligible for call screening.

The SCREEN option may configure the CALLSCREEN option of the telecommunications interface 100 to provide the option of screening out an incoming caller during the CALLSCREEN module processing when set. The ACCEPT option may configure the CALLSCREEN option to provide the option for the telecommunications interface 100 to accept an association of a voice with a telephone number in the CALLSCREEN module processing when set.

The ADD CALLER option, when set, may configure the CALLSCREEN option to provide the capability for the telecommunications interface 100 to add callers to the CALLSCREEN module processing.

The ADD NEW NAME option may configure the CALLSCREEN option to provide the capability for the telecommunications interface 100 to add new names to the CALLSCREEN module processing when set.

The CALLSCREEN module processing may include a software routine executed by the micro-controller 216 of the telecommunication interface 100. The CALLSCREEN module may include prompting the caller to state the caller's name. If the caller does not respond, the CALLSCREEN module prompts the caller to state the caller's name or the telephone call will not proceed. If the caller does not respond again with the caller's name, the CALLSCREEN module notifies the caller that the telephone call will not proceed and terminate the telephone call.

If the caller does respond with the caller's name, the CALLSCREEN module prompts the caller for the caller's telephone number. If the caller does not respond, the CALLSCREEN module prompts the caller to state the caller's telephone number or the telephone call will not proceed. If the caller does not respond again with the caller's telephone number, the CALLSCREEN module notifies the caller that the telephone call will not proceed and terminate the telephone call.

If the caller does respond with the caller's telephone number, the CALLSCREEN applies the speech recognition algorithms of the DSP 217 to determine if the caller is a new name for the CALLSCREEN module.

If the caller's name is new, the CALLSCREEN determines whether the caller's telephone number is new. If the caller's telephone number is new, the CALLSCREEN module prompts displays the caller's name and number to the user and prompts the user to accept the caller's subsequent telephone calls. If the user accepts the caller, the CALLSCREEN prompts the user to add the caller's name to the accept list for calls to pass through the CALLSCREEN module. Otherwise, the caller telephone call is allowed to proceed to the user. If the caller name is not accepted, the caller is prompted by an audio cue that the caller has been screened and the CALLSCREEN module terminates the telephone call.

If the caller's name is new and the caller's telephone number is old, the CALLSCREEN module displays the name and number and prompts the user whether the user would like to associate the new name with the old telephone number, add the caller's name, or to screen the caller. If the response from the user is to associate, the CALLSCREEN module associates the caller's new name with the caller's old telephone number. If the response is to add new name, the CALLSCREEN module adds the new name to the caller's telephone number. If the response is to screen, the CALLSCREEN module notifies the caller that the caller has been screened and terminates the telephone call.

If the caller's name is old and the caller's telephone number is new, the CALLSCREEN module displays the name and number and prompts the user whether the user would like to associate the caller's name with the new telephone number, add the telephone number, or to screen the caller. If the response from the user is to associate, CALLSCREEN module associates the caller's telephone number with the caller's name. If the response is to add new telephone number, the CALLSCREEN module adds the new telephone to the caller's name. If the response is to screen, the CALLSCREEN module notifies the caller that the caller has been screened and terminates the telephone call.

The OVM option may configure the telecommunications interface 100 to record an outgoing message by a user to be played back to the caller when an incoming telephone call is answered by the telecommunications interface 100 when set.

The TURNON PAGER # XX provides a user the capability of enabling a specific portable notifier 114a . . . 114n to communicate with the telecommunications interface 100 when set. Conversely, the TURNOFF PAGER # XX provides the user the capability of disabling a specific portable notifier 114a . . . 114n to communicate with the telecommunications interface 100 when not set.

The TIME EXTENSION OPTION, when set, provides a user with the capability to inform a holding incoming caller that the user will be answering the incoming telephone call shortly.

The X-10MODULE#XX ON, when set, provides a user with the capability of controlling a specific X-10 enabled appliance by the telecommunications interface 100 through the X-10 interface 221. Conversely, the X-10MODULE#XX OFF, when set, disables the capability of controlling the specific X-10 enabled appliance.

The ERASE MESSAGE option may configure the telecommunications interface 100 to provide the capability to a user an option to erase a stored message.

The LINE TAG A–Z option, when set, may configure the telecommunications interface 100 to provide the capability to a user an option to distinguish between multiple telecommunications interfaces with multiple lines in a cascaded configuration. Accordingly, in the event of multiple telecommunications interfaces, each telecommunications interface may be individually identified.

Figure 3:
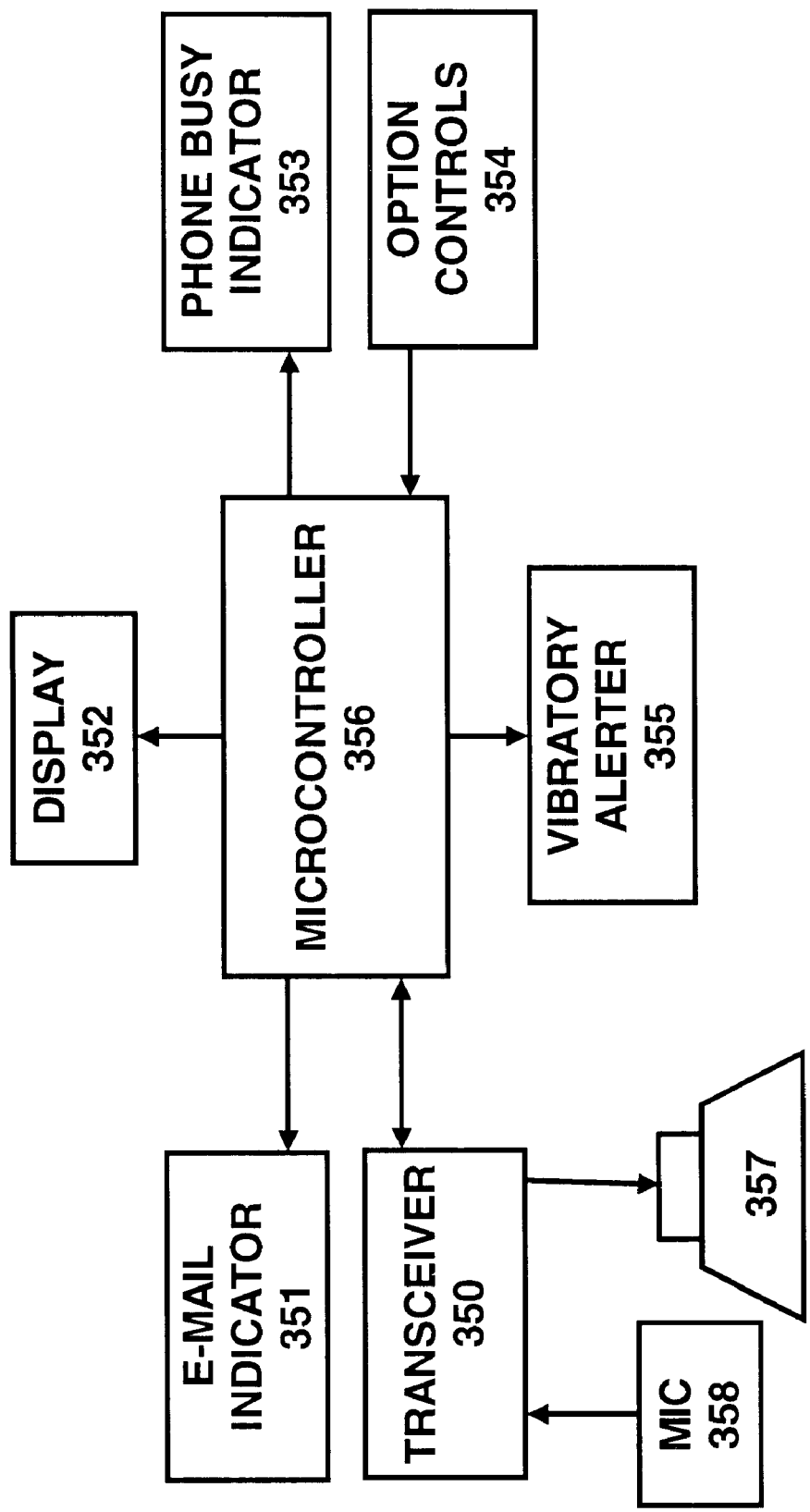
FIG. 3 illustrates a more detailed block diagram of a portable notifier for interfacing with the telecommunications interface of FIG. 1.

FIG. 3 illustrates a more detailed block diagram of one of the portable notifiers 114a . . . 114n shown in FIG. 1. In particular, the portable notifier 114a includes a transceiver 350 which may be configured to interface with the transceiver 116 of the telecommunications interface 100. The transceiver 350 of the portable notifier 114a may communicate with the transceiver 116 of the telecommunications interface 100 using a wireless protocol such as infrared, radio-frequency, and the like.

The transceiver 350 may be further configured to interface with a micro-controller 356 of the portable notifier 114a. The micro-controller 356 may be configured to provide the processing platform to implement the functionality of the portable notifier 114a, which may include a microprocessor, micro-controller, ASIC or the like.

The micro-controller 356 may be further configured to interface with a user interface of the micro-controller 356, which may include option controls 354, a speaker 357, a vibratory alerter 355, a phone busy indicator 353, an e-mail indicator 351, a display 352, and a microphone 358. The portable notifier 114a . . . 114n may be further configured to communicate with each other.

The option controls 354 may be configured the capability of remote selections of various functions of the telecommunications interface 100. The various functions of the telecommunications interface may include, but is not limited to: FAXANS 1$^{st}$, FAXANS, FAXINT, TADANS 1$^{st}$, TADANS, TADINT, PAGEALL, EMAIL, CALLSCREEN, RECORD outgoing voice message (O.V.M.), PLAY O.V.M., TURNON PAGER # XX, TIME EXTENSION, X-10MODULE#XX, ASSOCIATE CALLER, ADD NEW #, SCREEN, ACCEPT, ADD CALLER, ADD NEW NAME, and LINE TAG A–Z.

The options control 354 may further include a query button configured to request status of the telephones lines interfaced with the telecommunication interface 100. The status may include information on which portable notifier, 114a . . . 114n, is using which telephone line.

The option controls 354 may yet further include four directional control buttons configured to provide movement through a menu displayed on the display 352 generated by the micro-controller 356. An OK button may be included in the option controls 354 to provide for initiation of selected items as well as a TRACE button for unselecting an item previously selected.

The option controls 354 may yet further include a menu button configured to provide the telecommunication interface 100 to transmit menus to the portable notifiers 114a . . . 114n. The menus may include an initialization menu configured to initialize the telecommunication interface and an initialization menu for the multimedia relays 120a . . . 120n.

The menu controls may further include a data bank control configured to retrieved data stored in the memory 210 of the telecommunication interface 100. The data may include music, text, phone numbers, etc.

A lockout control may be provided with the menu control. The lockout control may be configured to provide control of a designated "parent" portable notifier over non-parent portable notifiers. Parent portable notifiers may override or pre-empt the usage of a telephone line by a non-parent portable notifier.

The menu control may yet further include a pager identification input configured to display a portable notifier identification number assigned by the telecommunication interface 100. A talk input may be included to provide the capability of a user of one portable notifier to communicate with another user of another portable notifier using voice.

The speaker 357 and microphone 359 are configured to provide the capability of inputting and outputting audio, respectively. A user of the portable notifier 114a may configure the portable notifier to indicate an incoming telephone call for the user, listen to stored electronic messages and/or recorded voice messages from the speaker 357. The user may also configure the portable notifier 114a to record outgoing voice messages, contact other users of the telecommunication interface 100, respond to electronic messages or the like with the microphone 359.

The phone busy indicator 353 may be configured to indicate a status of the telephone line at the telecommunications interface 100. The phone busy indicator 353 may be implemented with a light emitting diode or may be integrated in a graphical user interface of the display 352.

The e-mail indicator 351 may be configured to indicate the presence of an electronic message, e.g., e-mail, instant message, etc., in a user's electronic mailbox at the telecommunications interface 100. The e-mail indicator 351 may be implemented with an light emitting diode or may be integrated in a graphical user interface of the display 352.

The vibratory alerter 355 may be configured to indicate an incoming telephone call for a user by vibration in response to an identification of the incoming telephone call by the telecommunications interface 100.

The display 353 may be configured to provide a user visual indication of a received facsimile message for the user, electronic messages, voice messages and the like.

The above disclosed exemplary embodiment of the portable notifiers 114a . . . 114n show a separate device. The portable notifiers may be combined with other wireless devices, e.g., pagers, cellular phones, personal digital assistants, etc.

Figure 4:
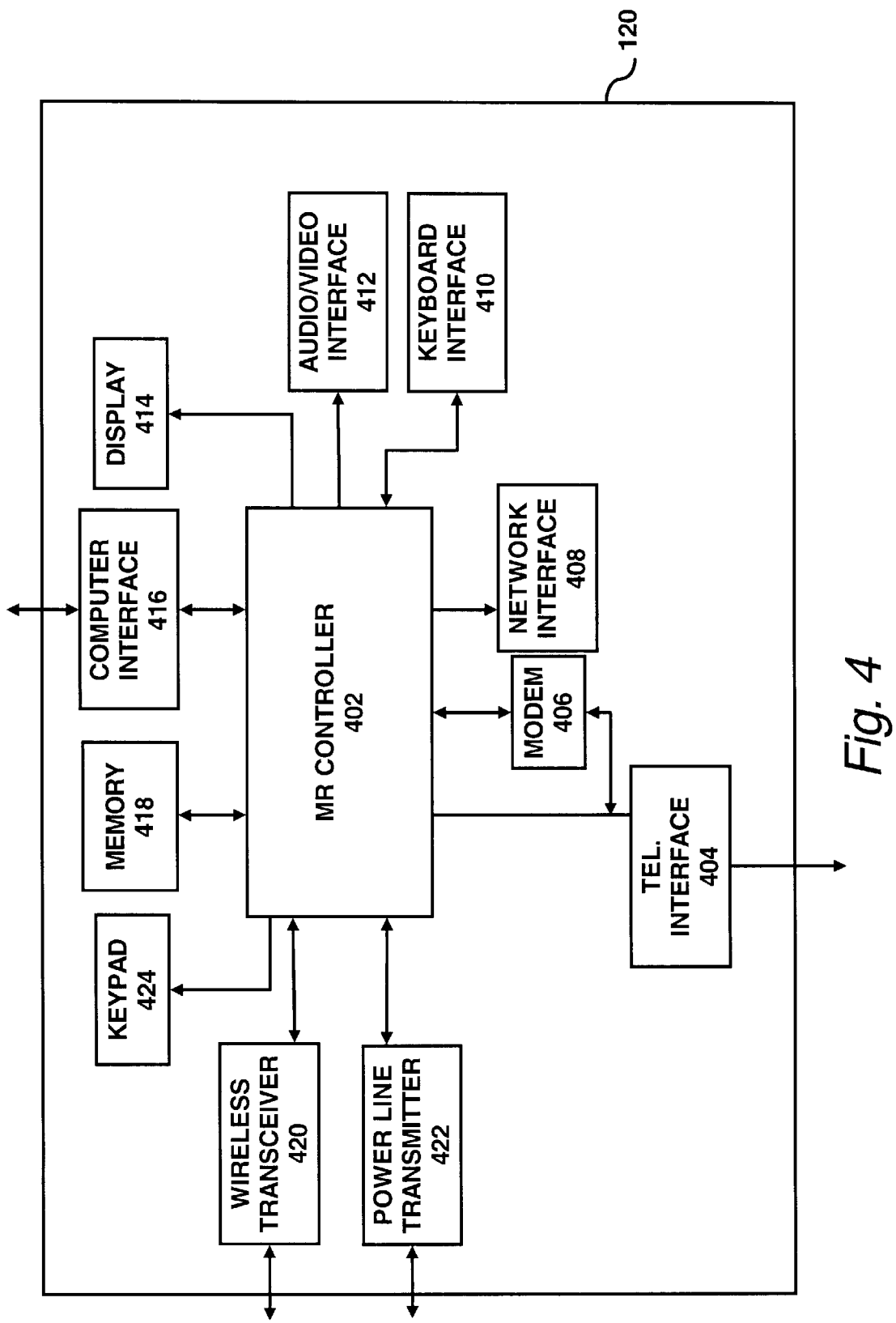
FIG. 4 illustrates a more detailed block diagram of a multimedia relay for interfacing with the telecommunication interface of FIG. 1.

FIG. 4 illustrates a more detailed block diagram of an embodiment of a multimedia relay 120, shown in FIG. 1, in accordance with the principles of the present invention. In particular, the multimedia relay 120 includes a multimedia relay ("MR") controller 402. The MR controller 402 may be configured to provide an execution platform for an application software that provides the functionality of the multimedia relay 120. The MR controller 402 may be implemented utilizing a microprocessor, a micro-controller, an application specific integrated circuit ("ASIC"), and the like.

The controller 402 may be configured to provide a telephone interface 404. The telephone interface 404 may be configured to provide an interface for the connection of a telephone line. The telephone interface 404 may conform with the standards of the public switched telephone network, ISDN, and the like. The telephone interface 404 may be configured by the MR controller 402 to provide a standby or emergency connection to the PSTN in the event that the telecommunication interface 100 becomes disabled.

Alternatively, the telephone interface 404 may be configured with a modem 406. The modem 406 may be configured to provide the capability of high-speed transferring data files between other modem-compatible devices. The modem 406 may be further configured to provide the capability of transfer of information substantially simultaneously while a telephone conversation is occurring.

The multimedia relay 120 may include a network interface 408. The network interface 408 may be configured to provide a communication path between a network and the multimedia relay to transfer data and/or commands. The network interface 408 may be further configured to interface with the MR controller 402 to transfer the data and/or commands to either other multimedia relays or the telecommunication interface 100. The network interface 408 may be implemented utilizing Ethernet protocol, token ring protocol or other local area network protocols known to those of ordinary skill in the art.

The MR controller 402 may be configured to interface with a keyboard interface 410. The keyboard interface 410 may be configured to provide a user with the capability to interface a keyboard or other input device to permit configuration of the multimedia relay 120 and/or telecommunication interface 100. With a keyboard interfaced at the keyboard interface 410, the user may transfer keyboard commands to configure the telecommunications interface 100.

The multimedia relay 120 includes an audio/video ("A/V") interface 412. Although FIG. 4 shows one audio/video interface 412, the present invention contemplates embodiments of the multimedia relay with multiple audio/video interfaces. The AN interface 412 may be configured to provide a communication path between audio/video equipment and the multimedia relay 120 to transfer audio and/or video data. The AN interface 412 may be further configured to interface with the MR controller 402 to transfer the audio and/or video data to either other multimedia relays or the telecommunication interface 100. The A/V interface 412 may be implemented utilizing RCA jacks, optical jacks, and the like.

The MR controller 402 may be further configured to interface with a display 414. The display 414 may be configured to provide a visual interface for the multimedia relay 120. The display may display configuration options, identification numbers, data, and the like for the user.

The multimedia relay 120 may further include a computer interface 416. Although FIG. 4 shows one computer interface 416, the present invention contemplates embodiments of the multimedia relay with multiple computer interfaces. The computer interface 416 may be configured to provide a communication path between a computer and the multimedia relay 120 to transfer computer data. The computer interface 416 may be further configured to interface with the MR controller 402 to transfer the computer data to either other multimedia relays or the telecommunication interface 100. The A/V computer interface 416 may be implemented utilizing serial ports, parallel ports, universal serial bus ports, IEEE 1394 ports, and the like.

The MR controller 402 may be configured with a memory 418. The memory 418 may be configured to provide storage and execution for the application software that provides the functionality of the multimedia relay 120. The memory 418 may be implemented utilizing a flash memory, a disk memory, or other types of memory.

The multimedia relay 120 may further include a wireless transceiver 420. The wireless transceiver 420 may provide a communication path between the multimedia relay 120, other multimedia relays, and the telecommunication interface 100. The wireless transceiver 420 may be further configured to interface with the MR controller 402 to transfer multimedia data to either other multimedia relays or the telecommunication interface 100. The wireless transceiver 420 may be implemented utilizing RF protocols, optical protocols, Bluetooth or the like.

In a preferred embodiment of the multimedia relay 120, the transfer of information between among the multimedia relays or between the multimedia relays and the telecommunications interface 100 is implemented utilizing the wireless transceiver 420. Alternatively, a power line transmitter 422 may also be utilized. The power line transceiver 422 may be configured to transfer data from the MR controller 402 to either other multimedia relays or the telecommunication interface 100 over the power supply lines of the device in the overall system.

FIG. 5 illustrates a flow diagram of an initialization module 500 for the telecommunication interface 100 in accordance with the principles of the present invention. The initialization module 500 may be configured to provide a user the capability to personalize the telecommunication interface 100 for operational use. The initialization module 500 may be invoked during power up of the system or a user may enter the initialization module 500 from selecting an initialization option from the option controls 354 of the telecommunications interface.

In a preferred embodiment, the microcontroller 216 provides an audible interface for a user to interact with the initialization module 500. Alternatively, it is also contemplated that the user may interact with the initialization module 500 through the display 211 and the option controls 210.

As shown in FIGS. 5A–5H, the initialization module 500 is invoked by a user, in step 501. The initialization module 500 may prompt the user with an audio cue if the user would prefer to use the default setting, in step 502. If the user responds with a positive response from step 502, the initialization module 500 prompts the user with an audio cue to record an outgoing voice message in step 503. The initialization module 500 records and stores the user's outgoing voice message and sets the telecommunication interface 100 in a default mode, in step 504.

The default mode of the telecommunication interface 100 may be set by a manufacturer. The default mode may include the FAXANS not set, TAD ANS not set, PAGEALL not set, CALL SCREEN not set, and portable notifiers one through three activated. The initialization module 500 then directs the telecommunication interface 100 to proceed to call processing, shown in FIGS. 6A–6E, in step 505, which is described in greater detail below.

If the user responded with a negative response, e.g., "NO", from step 502, the initialization module 500 prompts the user with an audio cue whether the user would prefer switching to a non-vocal set-up, in step 506. The initialization module 500 sets a timer, in step 507, and waits for a response from the user in step 508.

If the user responds with a positive response, the initialization module 500 proceeds to the non-vocal setup, in step 509. The initialization module 500 then disables the speech processing functions of the telecommunication interface 100 and enables the display 211 and options control 210, in step 510. In the non-vocal setup, the initialization module 500 prompts the user through the display 211 and responses from the user are processed through the option controls 210.

If the user has responded with a negative response, in step 508, and the time has elapsed in step 511, the initialization module 500 proceeds with providing user prompts as audio cues and processing responses through the speech processing functions of the telecommunications interface 100.

In step 512, the initialization module 500 prompts the user whether to set the FAX ANS #1 option, which configures the telecommunications interface 100 to respond to any incoming telephone calls as an incoming telephone call and to direct the incoming telephone call to the facsimile processing of the telecommunications interface 100. The initialization module 500 sets the FAXANS #1 in response to a positive response from a user and unset in a response to a negative response from the user, in step 513.

Figure 5A:
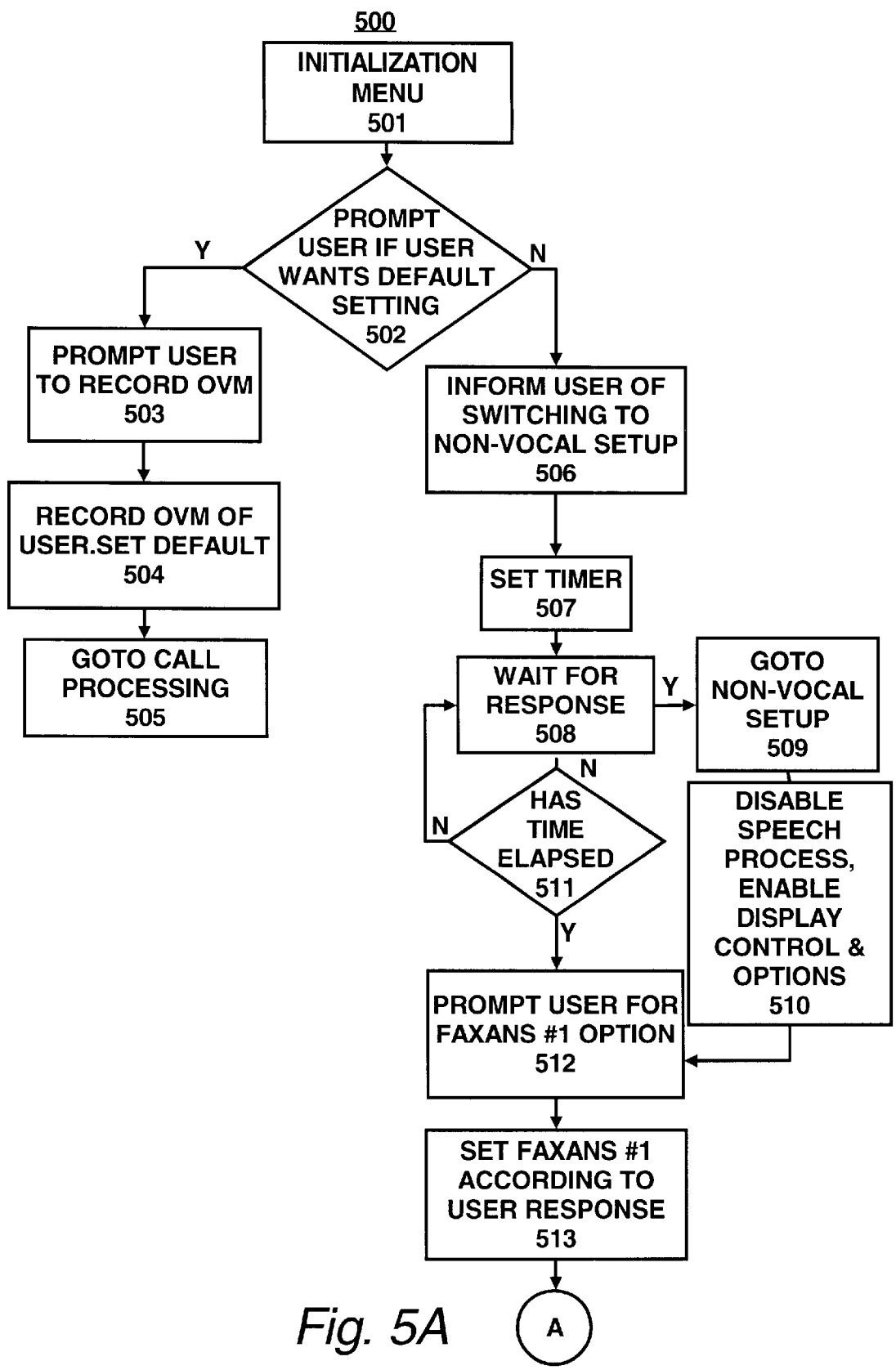
FIGS. 5A–5H illustrate a flow diagram for an exemplary initialization module of the telecommunication module.
Figure 5B:
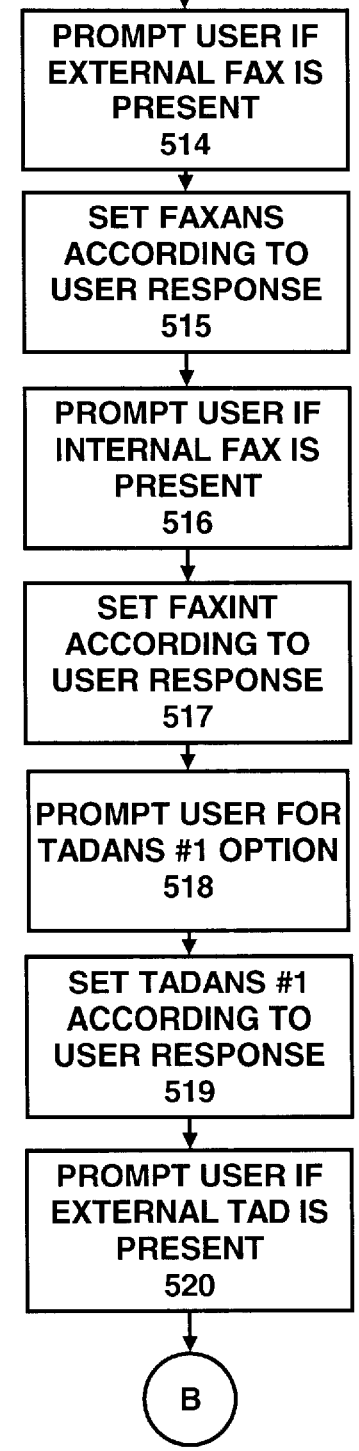

With reference to FIG. 5B, in step 514, the initialization module 500 prompts the user whether there is an external facsimile machine interfaced with the telecommunication interface 100 at fax port 109. The initialization module 500 sets the FAXANS option in response to a positive response from a user and unsets in a response to a negative response from the user, in step 515.

In step 516, the initialization module 500 prompts the user whether an internal facsimile machine has been provided by the manufacturer of the telecommunication interface 100. The internal facsimile machine may be implemented by a hardware circuit or as an application software executed by the controller 216. The initialization module 500 sets the FAXINT option in response to a positive response from a user and unsets in a response to a negative response from the user, in step 517.

In step 518, the initialization module 500 prompts the user whether to set the TADANS #1 option, which configures the telecommunications interface 100 to direct an incoming telephone call to the TAD processing of the telecommunications interface 100 at the TAD port 109. The initialization module 500 sets the TADANS #1 in response to a positive response from a user and unsets in a response to a negative response from the user, in step 519.

Figure 5C:
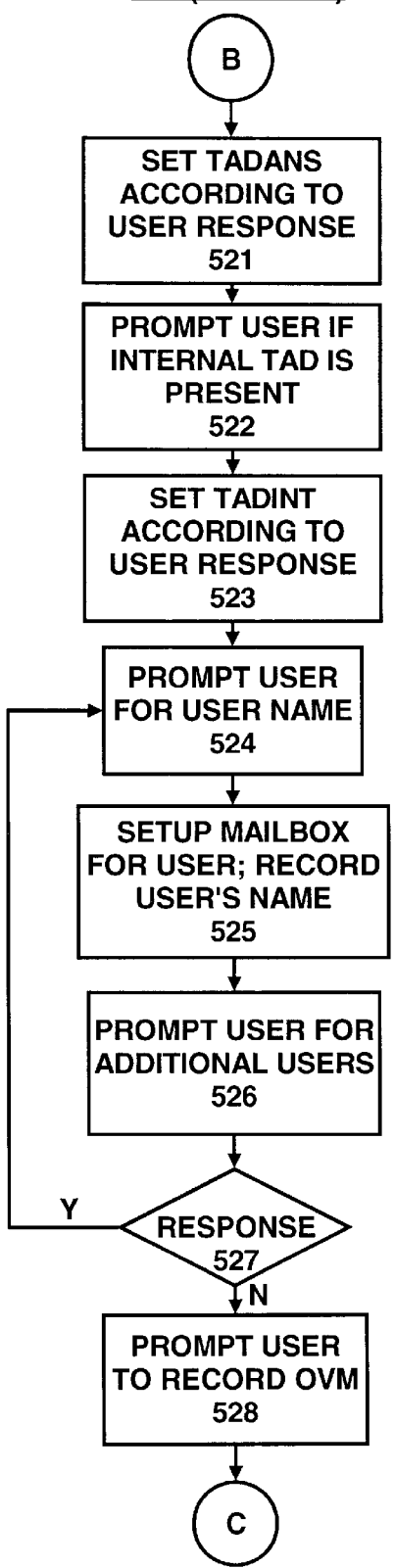

In step 520, the initialization module 500 prompts the user whether there is an external TAD machine interfaced with the telecommunication interface 100 at TAD port 110. With reference to FIG. 5C, the initialization module 500 sets the TADANS option in response to a positive response from a user and unsets in a response to a negative response from the user, in step 521.

In step 522, the initialization module 500 prompts the user whether an internal TAD has been provided by the manufacturer of the telecommunication interface 100. The internal TAD may implemented by a hardware circuit or as an application software executed by the controller 216. The initialization module 500 sets the TADINT option in response to a positive response from a user and unsets in a response to a negative response from the user, in step 523.

In step 524, the initialization module 500 prompts the user for a name of a user of the telecommunication interface 100. The initialization module 500 captures and stores the spoken name. The initialization module 500 sets up an electronic mailbox to store messages intended for the named user, in step 525. The initialization module 500 prompts the user for the names of additional users, in step 526. If the response to the prompt in step 527 is positive, the initialization module 500 returns to step 524. Otherwise, the initialization module 500 prompts the user to record an outgoing voice message, in step 528.

Figure 5D:
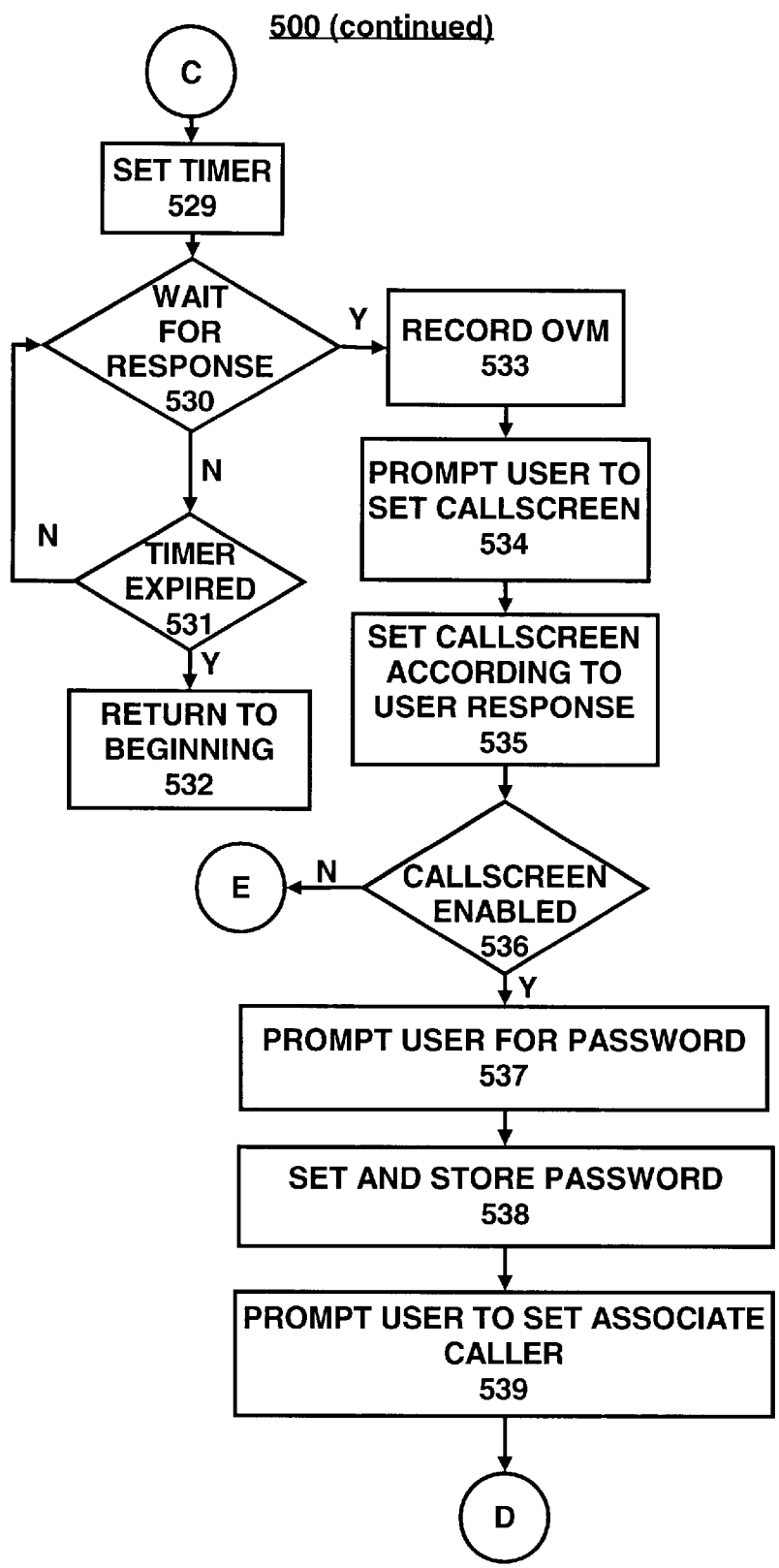

With reference to FIG. 5D, the initialization module 500 sets a response timer, in step 529. Then, the initialization module 500 waits for a response from the user, in step 530. If the user does not respond by the expiration of the timer, in step 531, the initialization module 500 is returned to the beginning, in step 501. If a user responds before the timer has expired, the initialization module 500 records the outgoing voice message, in step 533.

In step 534, the initialization module 500 prompts the user whether or not to set the CALLSCREEN option of the telecommunication interface 100. The initialization module 500 sets the CALLSCREEN option in response to a positive response from a user and unset in a response to a negative response from the user, in step 535.

If the CALLSCREEN option is enabled in step 536, the initialization module 500 prompts the user for a password to enable access to the CALLSCREEN option, in step 537. The initialization module 500 records and stores the password of the user, in step 538.

Figure 5E:
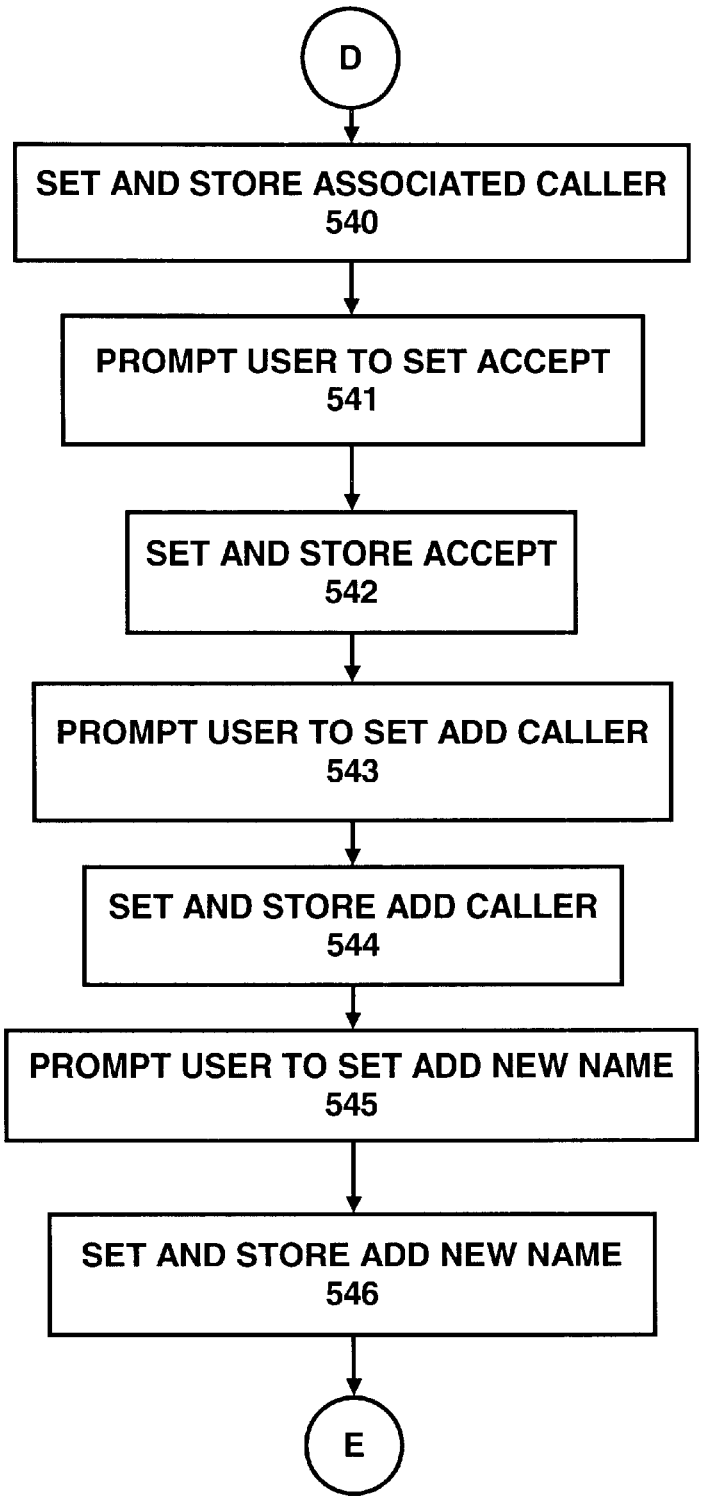

In step 539, the initialization module 500 prompts the user to set the ASSOCIATE CALLER option of the telecommunication interface 100. With reference to FIG. 5E, the initialization module 500 sets the ASSOCIATE CALLER option in response to a positive response from a user and unsets in a response to a negative response from the user, in step 540.

In step 541, the initialization module 500 prompts the user to set the ACCEPT option of the telecommunication interface 100. The initialization module 500 sets the ACCEPT option in response to a positive response from a user and unset in a response to a negative response from the user, in step 542.

In step 543, the initialization module 500 prompts the user to set the ADD CALLER option of the telecommunication interface 100. The initialization module 500 sets the ADD CALLER option in response to a positive response from a user and unset in a response to a negative response from the user, in step 544.

In step 545, the initialization module 500 prompts the user to set the ADD NEW NAME option of the telecommunication interface 100. The initialization module 500 sets the ADD NEW NAME option in response to a positive response from a user and unset in a response to a negative response from the user, in step 546.

Figure 5F:
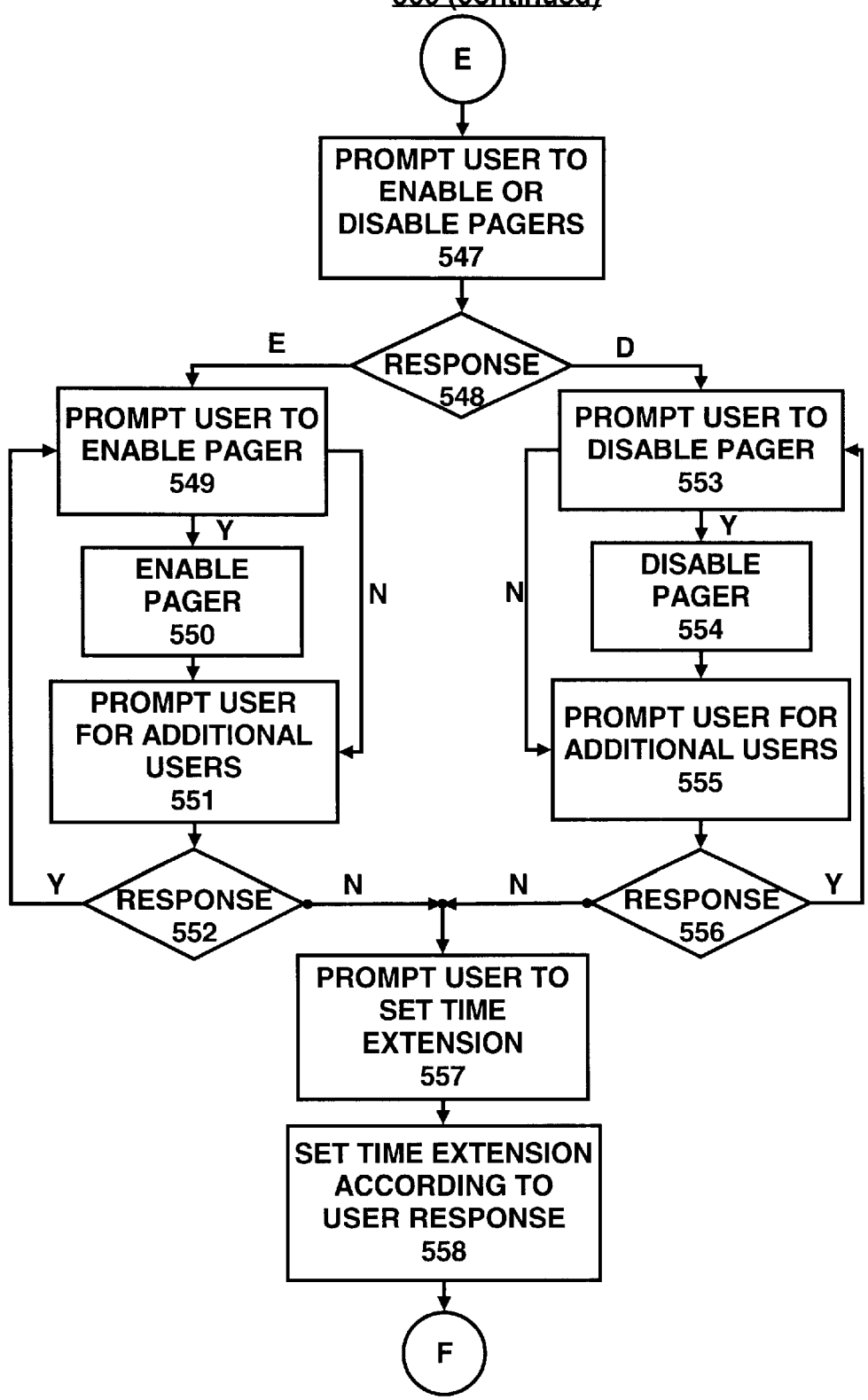

With reference to FIG. 5F, in step 547, the initialization module 500 prompts the user to enable or disable the portable notifiers 114a . . . 114n shown in FIG. 1. If the response from step 548 is enable, the initialization module 500 prompts the user to enable a pager for one of the named users captured earlier and asks whether to associate the user with a portable notifier, in step 549. The initialization module 500 initiates an initialization routine to associate one of the portable notifiers 114a . . . 114n for the named user in response to a positive response, in step 550. Otherwise, the initialization module 500 proceeds to step 551 in response to a negative response, in step 549. Returning to step 551, the initialization module 500 prompts the user whether there are additional portable notifiers to enable for users. If there are additional users, in step 552, the initialization module 500 returns to step 549.

If the response is disable from step 548, the initialization module 500 prompts the user with a name of the user that were stored earlier and asks whether to dissociate a portable notifier with the name of the user, in step 553. The telecommunication interface 100 initiates a disassociation routine to remove the associated portable notifier with the name of the user in response to a positive response in step 554. Otherwise, the initialization module 500 proceeds to step 555.

In step 555, the initialization module 500 prompts the user whether to disassociate more users from their pagers. If the response is positive in step 556, the initialization module 500 returns to step 553. Otherwise, the initialization module 500 proceeds to step 557 where the user is prompted by the initialization module 500 whether to set the TIME EXTENSION option. The initialization module 500 sets the TIME EXTENSION option in response to a positive response from a user and unset in a response to a negative response from the user, in step 558.

Figure 5G:
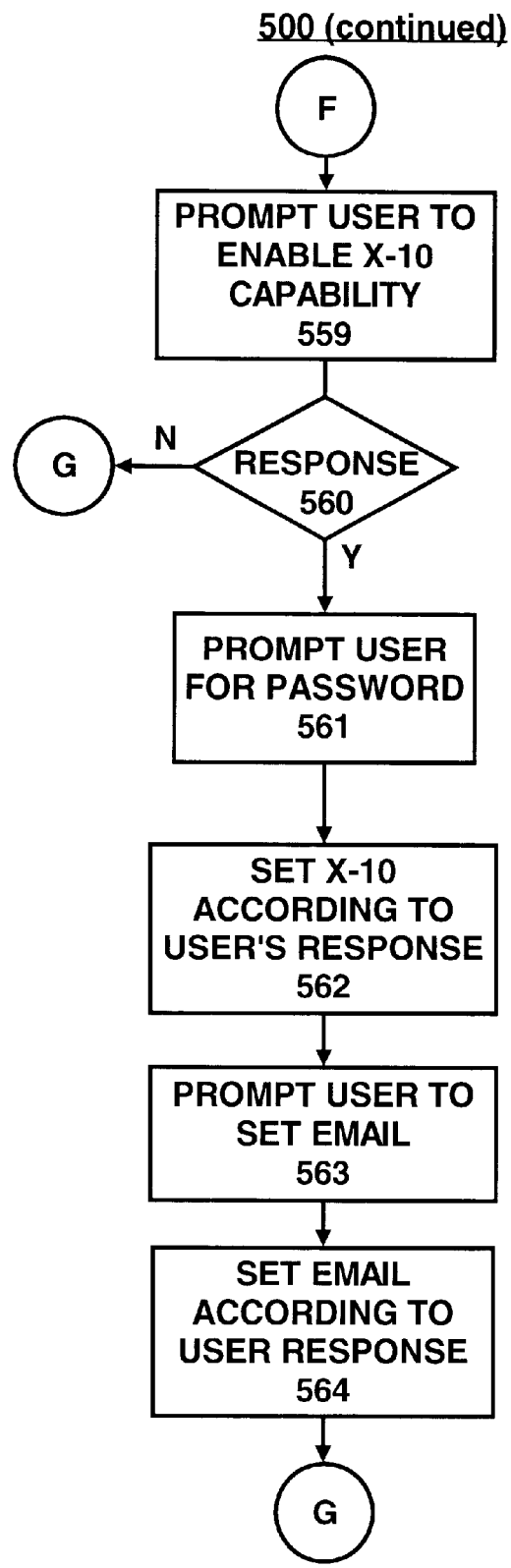

With reference to FIG. 5G, in step 559, the initialization module 500 prompts the user to set the X-10 option of the telecommunication interface 100. The initialization module 500 proceeds to step 563 in response to a negative response from step 560. Otherwise, the initialization module 500 prompts the user for an X-10 module password to access the X-10 module at a later time and stores the password, in step 562.

In step 563, the initialization module 500 prompts the user to set the EMAIL option to notify a user of received electronic messages. The initialization module 500 sets the EMAIL option according to the user response, in step 564.

Figure 5H:
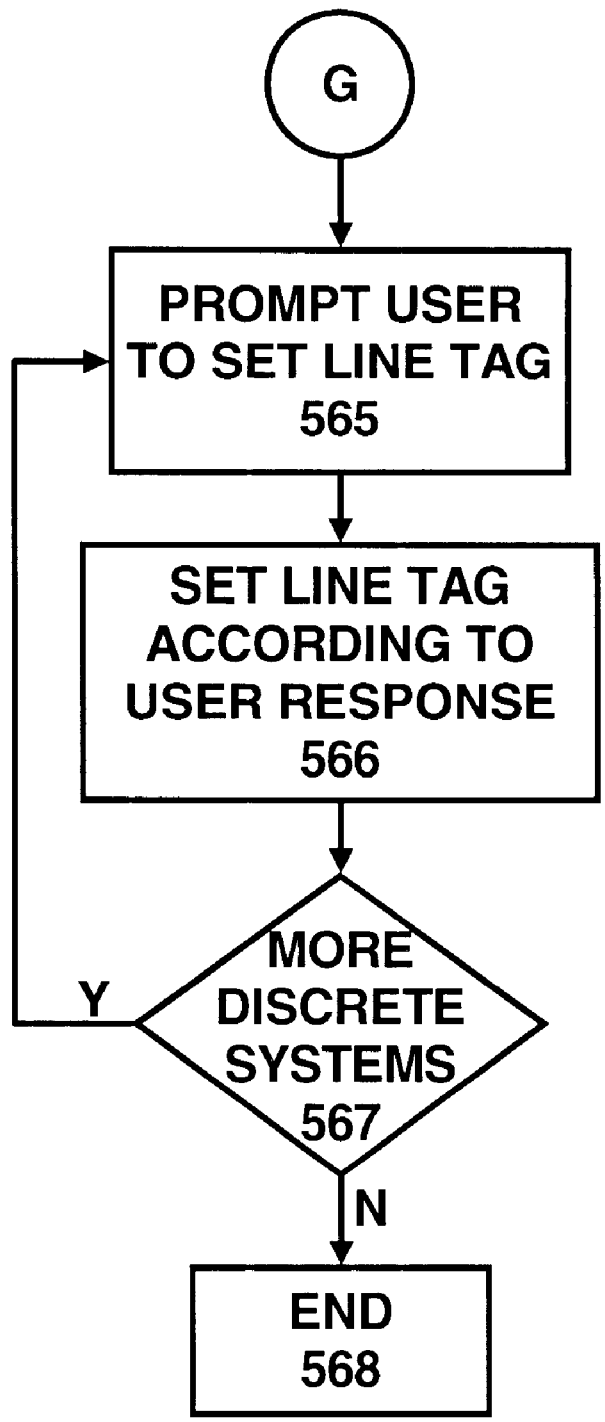

With reference to FIG. 5H, in step 565, the initialization module 500 prompts the user to set the LINE TAG option. The initialization module 500 sets the LINE TAG option according to the response of the user, in step 568.

FIGS. 6A–6E, together, illustrate a flow diagram of a call processing module 600 of the telecommunications interface in accordance with the principles of the present invention. The call processing module 600 is invoked by the telecommunication interface 100 in answering incoming telephone calls.

Figure 6A:
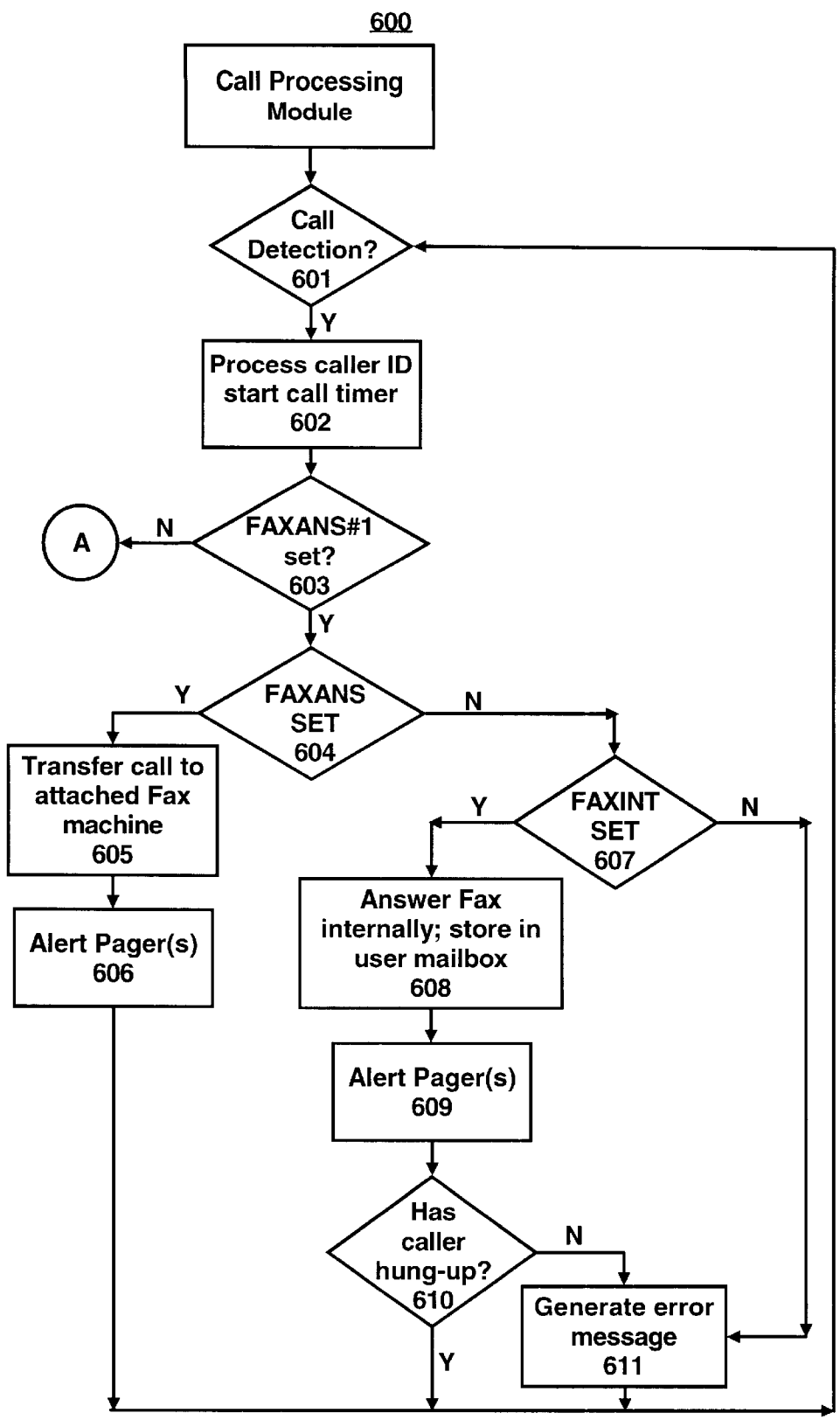
FIGS. 6A–6E illustrate a flow diagram flow diagram for a call processing module of the telecommunications interface.

With reference to FIG. 6A, the call processing module 600 is in a wait state waiting for a call event or an incoming telephone call over the telephone line interface 102 of the telecommunication interface 100, in step 601. If an incoming telephone call is not detected, the call processing module 600 remains in the wait state.

Else, if there is an incoming telephone call detected in step 601, the call processing module 600 begins to process caller identification information associated with the incoming telephone call, in step 602. The caller identification information is stored temporarily in memory 219 for later processing by the telecommunication interface 100. The call processing module 600 also initiates a master call timer.

In step 603, the call processing module 600 checks whether the FAXANS #1 option was set during the initialization module 500 processing, as shown in FIGS. 5A–5H. If the FAXANS#1 is set, in step 603, the call processing module 600 determines whether the FAXANS option was set during the initialization module 500 processing. If so, the incoming telephone call is transferred to an attached facsimile machine interface at fax port 109 of the telecommunication interface 100, in step 605. After the call has been transferred to the external facsimile machine, the portable notifiers 114a . . . 114n are notified of the incoming telephone call by the telecommunication interface 100. The notification may include a blinking light on the portable notifiers 114a . . . 114n, or a notification message that is displayed on the display 352 of the portable notifiers 114a . . . 114n.

If the FAXANS option is not set from step 604, the call processing module 600 determines if the FAXINT option is set, in step 607. If the FAXINT option is set, the incoming telephone call is answered by the controller 216 functioning as a facsimile machine, in step 608. The facsimile message is stored in a predetermined user's mailbox. After the message is stored, the portable notifiers 114a . . . 114n are notified of the completed facsimile. Then, the call processing module 600 determines if the caller has placed the call on-hook, in step 610. If the caller has hung-up the telephone line in step 610, the call processing module 600 returns to step 601. Otherwise, the call processing module 600 generates an error message to the caller and terminates the telephone call, in step 611. The call processing module 600 then proceeds to step 601.

If the FAXINT option is not set from step 607, the call processing module 600 generates an error message to the caller and terminates the telephone call. The call processing module 600 then proceeds to step 601.

Figure 6B:
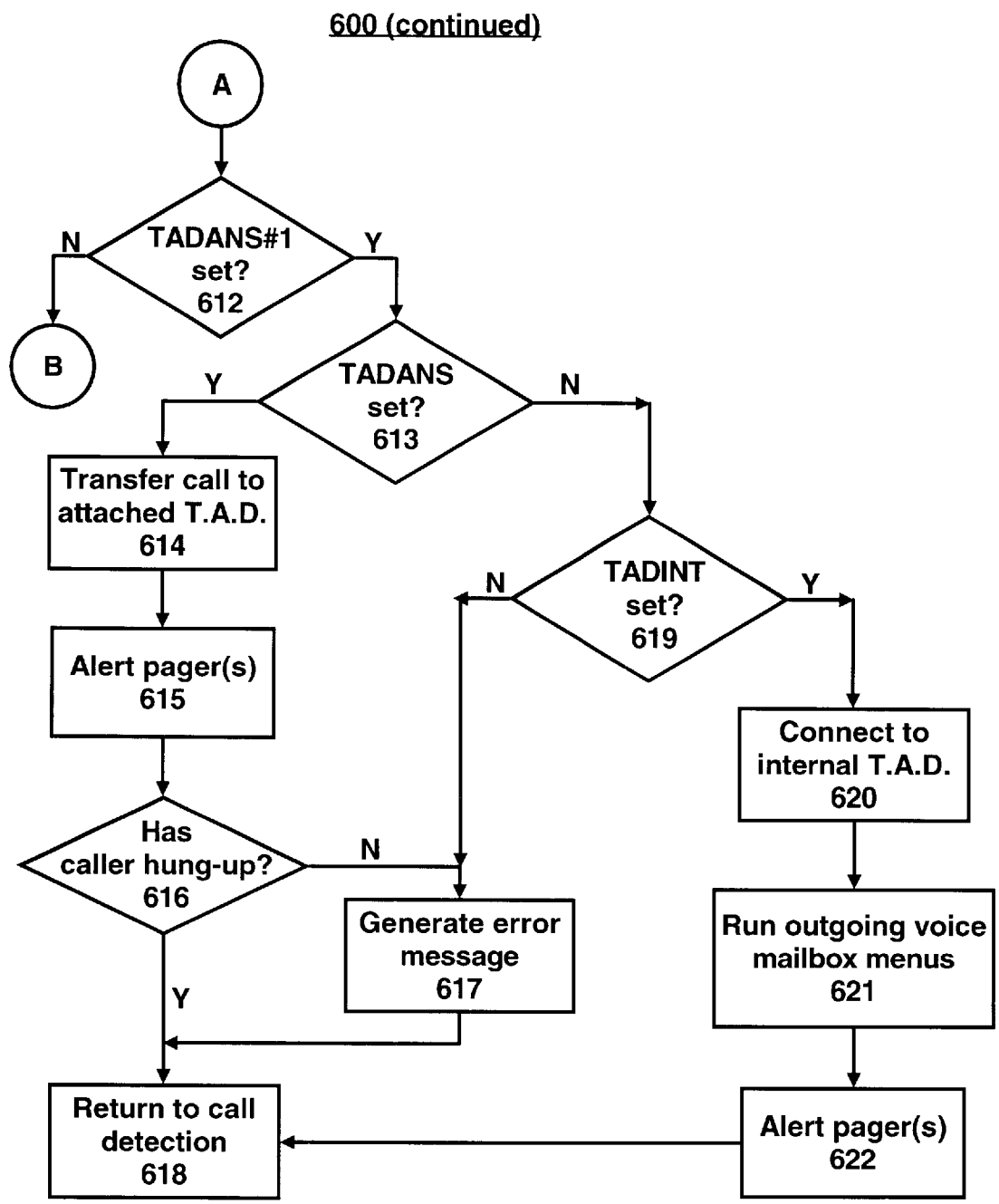

Returning to step 603 of FIG. 6A, if the FAXANS #1 option is not set, the call processing module 600 proceeds to step 612 of FIG. 6B. With reference to FIG. 6B, the call processing module 600 determines whether the TADANS #1 option was set during the initialization module processing, in step 613. If TADANS #1 is set, the call processing module 600 transfers the incoming telephone call to an external TAD interfaced at the TAD port 110 of the telecommunication interface 100. After the call has been transferred to the external TAD, the portable notifiers 114a . . . 114n are notified of the incoming telephone call, in step 615. The notification may include a blinking light on the portable notifiers 114a . . . 114n, or a notification message that is displayed on the display 352 of the portable notifiers 114a . . . 114n. Then, the call processing module 600 determines if the caller has placed the call on-hook, in step 616. If the caller has hung-up the telephone line in step 616, the call processing module 600 returns to step 601, in step 618. Otherwise, the call processing module 600 generates an error message to the caller and terminates the telephone call, in step 617. The call processing module 600 then proceeds to step 601, in step 618.

If the TADANS option is not set from step 613, the call processing module 600 determines if the TADINT option is set, in step 619. If the FAXINT option is set, the incoming telephone call is answered by the controller 216 functioning as a TAD, in step 620. The message is stored in a predetermined user's mailbox. After the message is stored, outgoing messages stored by the telecommunication interface 100 are played for the caller, in step 621, and the portable notifiers 114a . . . 114n are notified of the completed message, in step 622. The call processing module 600 then proceeds to step 601, in step 618.

If the TADINT option is not set from step 619, the call processing module 600 generates an error message to the caller and terminates the telephone call, in step 617. The call processing module 600 then proceeds to step 601.

Figure 6C:
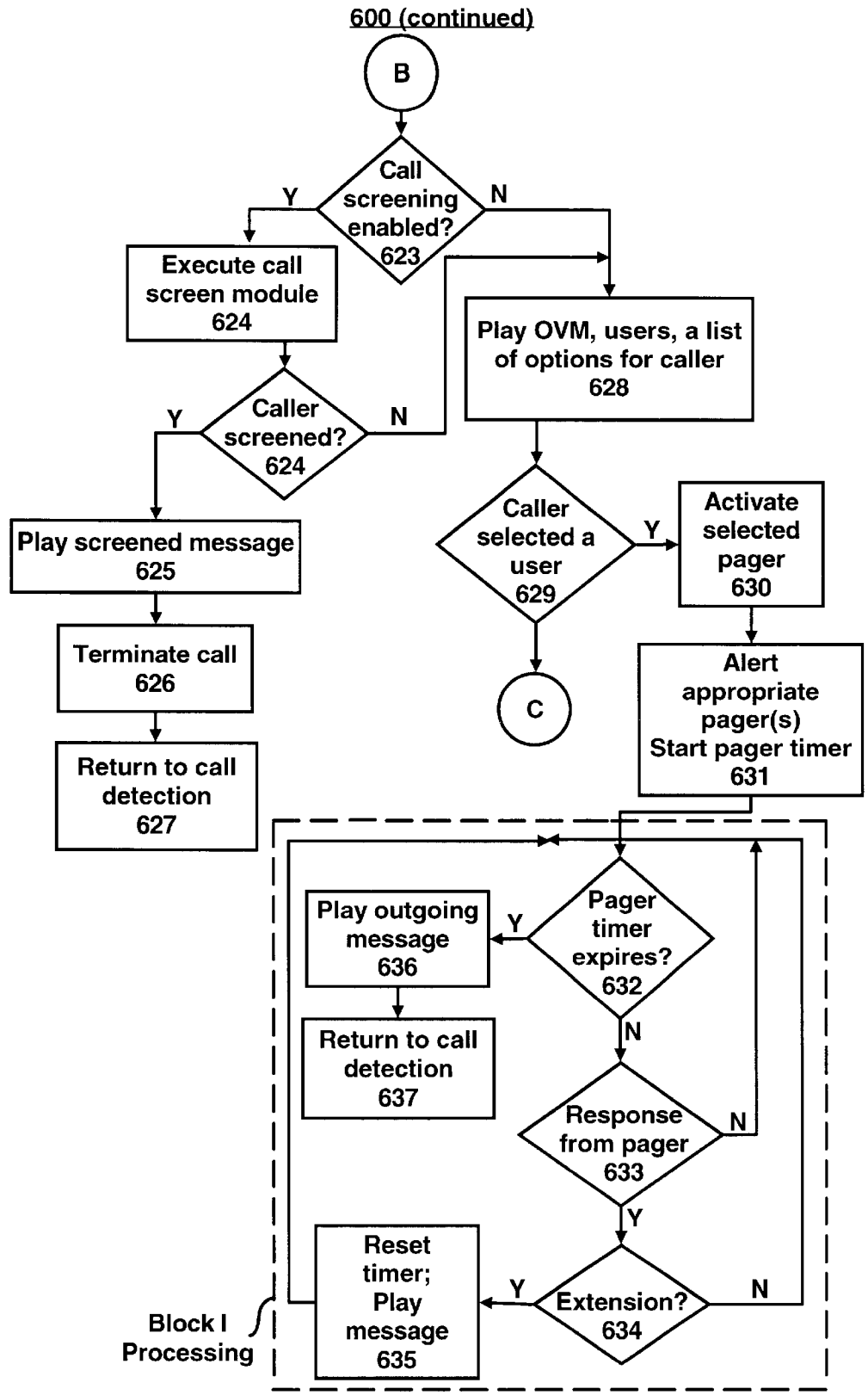

Returning to step 612, if the TADANS #1 option was not set, the call processing module 600 proceeds to step 623 of FIG. 6C. With reference to FIG. 6C, the call processing module 600 determines if the CALL SCREEN option is enabled, in step 623. If the CALL SCREEN option is enabled, the incoming telephone call is subject to a call screen module processing, in step 624. After performing call screening, if the caller is determined to be screened from step 624, the call processing module 600 prompts the caller with an audio cue that the caller has been screened, in step 625. The call processing module 600 terminates the telephone call, in step 626, and returns to step 601, in step 627.

If the caller is determined not to have been screened by the call screen module, in step 624, the call processing module 600 proceeds to step 628. Returning to step 623 of FIG. 6C, if the CALL SCREEN option is not set, the call processing module 600 proceeds to step 628, where the call processing module 600 replays the outgoing voice message previously recorded in the initialization module processing 500. Also, in step 628, a list of users is replayed from the list of users created in during the initialization module processing 500, as described herein above. Further, the call processing module 600 provides an menu for contacting the list of users and alternative actions that may be taken by the caller provided by the telecommunication interface 100.

If the caller selects an option for contacting one user from the list of users, in step 629, the call processing module 600 processes the request to contact the one user. The call processing module 600 notifies the corresponding portable notifier of the one user, in step 630. The corresponding portable notifier is alerted and a pager timer is initiated, in step 631.

In step 632, the call processing module 600 determines whether the pager timer has expired yet. If the paging timer has expired, in step 632, the call processing module 600 determines if there has been a response from the portable notifier, in step 633. If telecommunication interface 100 has not yet received a response from a pager, the call processing module 600 returns to step 632. Else, the call processing module 600 determines if the response is a request for an extension of time for answering the incoming telephone call, in step 634. If the response is a request for time, the call processing module 600 resets the pager time, in step 635, and the call processing module 600 returns to step 632.

Returning to step 632 of FIG. 6C, if the pager time has expired, the call processing module 600 replays an audio prompt informing the caller that the selected user is unable to answer. Then, in step 637, the call processing module 600 returns to step 601.

Figure 6D:
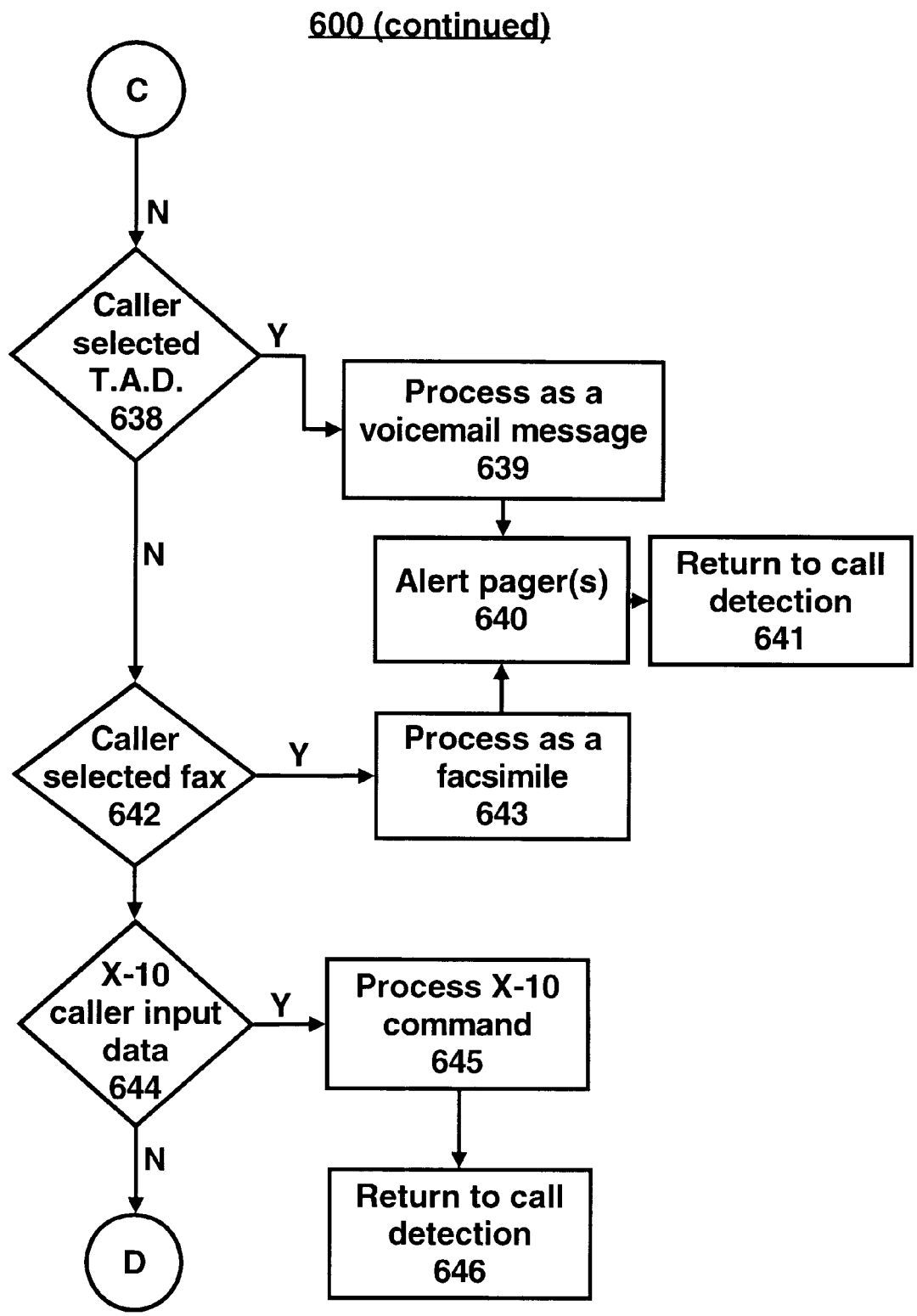

The telecommunication interface may detect several possible responses from the caller from step 628 of FIG. 6C. With reference to FIG. 6D, a caller may select an option of leaving a message in a voice mailbox of a selected user, in step 638. If the call processing module 600 processes the selected option, the call processing module 600 plays an outgoing message identifying the selected user mailbox by name, which was recorded during the initialization module processing, as shown in FIGS. 5A–5H, in step 639. After the telecommunication interface 100 records and stores the message in the selected user's mailbox, the call processing module 600 alerts a portable notifier of the selected user, in step 640. Then, call processing module 600 returns to step 601 to wait for another telephone call, in step 641.

If the call processing module 600 detects that the caller has selected the facsimile option of the menu, in step 642, the call processing module 600 processes the incoming telephone call as a facsimile message, which is stored in a designated user's mailbox, in step 643. The call processing module 600 then proceeds to step 640 to complete the incoming telephone call.

If the call processing module 600 detects that the caller has activated the X-10 module 221 by entering the appropriate password, the call processing module 600 may be configured to receive the X-10 commands from the caller, in step 645. After the caller is finished, the call processing module 600 proceeds to step 601, in step 646.

Figure 6E:
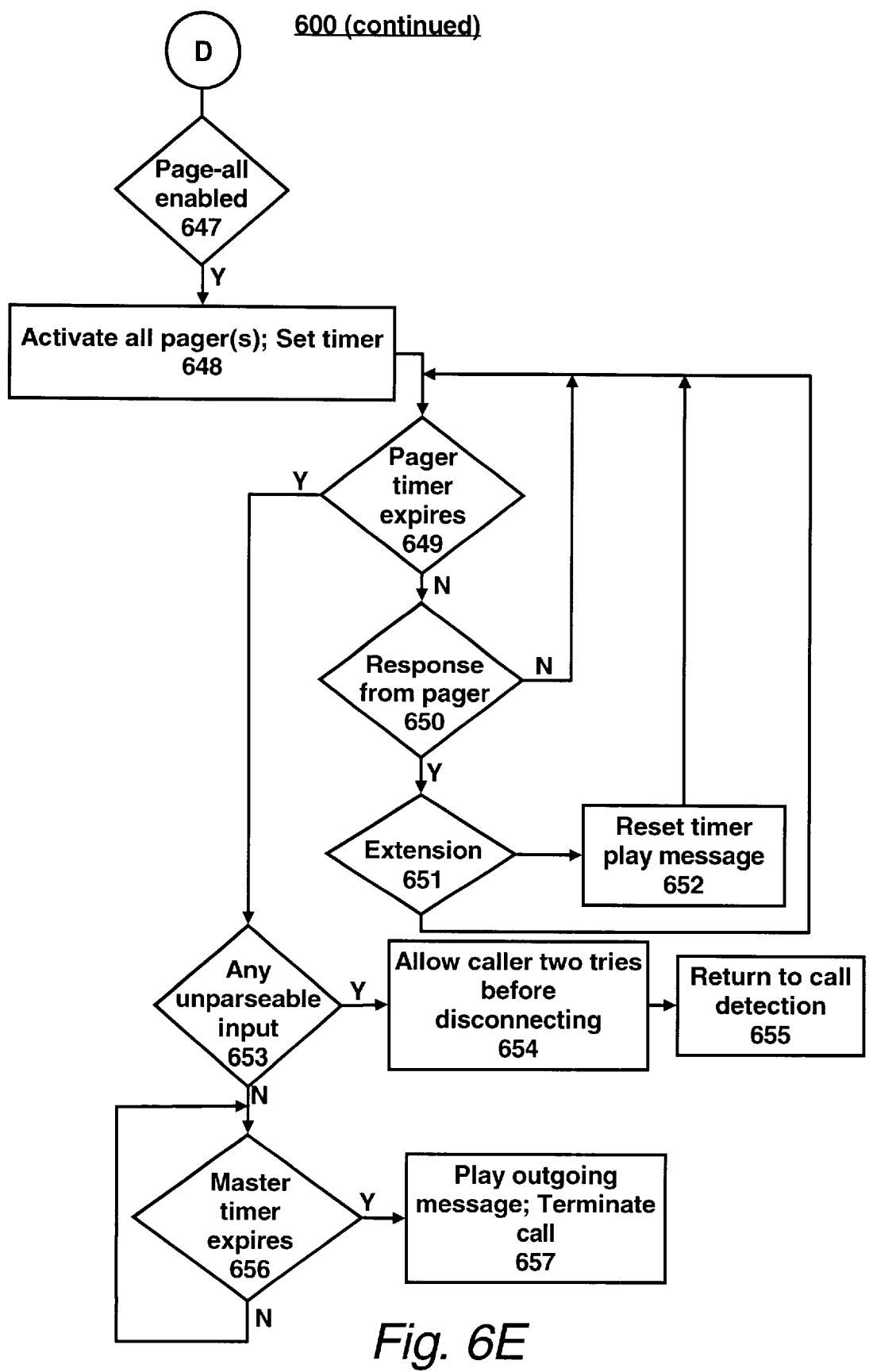

With reference to FIG. 6E, if the call processing module 600 detects that the caller has initiated a message to notify all of the portable notifiers, if enabled, interfaced with the telecommunication interface 100, in step 647. The call processing module 600 activates the portable notifiers to notify the respective user, in step 648. The call processing module 600 may also set a timer to prevent excessive waiting by the caller. Then, the call processing module 600 determines whether the pager timer has expired, in step 649. If the pager time has expired, the call processing module 600 proceeds to step 653. Otherwise, if the pager timer has not expired, in step 649, the call processing module 600 determines whether a response has been received by the portable notifiers, in step 650.

If there is no response from any of the pagers, in step 650, the call processing module 600 returns to step 649. Otherwise, the call processing module 600 determines whether the pager is a request for an extension of time in step 651.

If the request is not a request for extension of time, in step 651, the call processing module 600 returns to step 649. Otherwise, the call processing module 600 resets the pager timer and plays an audio message to the caller that the call will be answered, in step 652.

Returning to step 653, if there has been any inputs that have been detected by the call processing module 600 and did not match on the available option, in step 653, the call processing module 600 provides a user to input a valid selection for two more attempts before disconnecting the caller, in step 654. Then, the call processing module 600 proceeds to step 601.

If a caller has not selected an option, the call processing module 600 will wait till the master call timer has expired, in step 656, to play an outgoing message informing the caller has not responded in a timely fashion and the call will be terminated, in step 657. Then, the call processing module 600 proceeds to step 601.

While the invention has been described with reference to the exemplary embodiments thereof, those skilled in the art will be able to make various modifications to the described embodiments of the invention without departing from the true spirit and scope of the invention.

What is claimed is:

1. A system for providing a stress-free environment said system comprising:
a telecommunication interface configured to receive an incoming telephone call for a user; and
a portable notifier configured to interface with said telecommunication interface,
wherein said telecommunication interface is further configured to notify said user of said incoming telephone call on said portable notifier in response to said telecommunication interface intercepting said incoming telephone call prior to ringing of said incoming telephone call, and said telecommunication interface is further configured to provide a caller a menu for contacting said user.

2. The system for providing a stress-free environment according to claim 1, wherein said telecommunication interface is further configured to forward said incoming telephone call to a facsimile processing module in response to a caller selecting a facsimile option from said menu for contacting said user.

3. The system for providing a stress-free environment according to claim 1, wherein said telecommunication interface is further configured to forward said incoming telephone call to a telephone answering device processing module in response to a caller selecting a telephone answering device option from said menu for contacting said user.

4. The system for providing a stress-free environment according to claim 1, wherein said telecommunication interface is further configured to send a notification message of said incoming telephone call in response to a caller selecting a paging option from said menu for contacting said user.

5. The system for providing a stress-free environment according to claim 4, wherein said portable notifier is further configured to display a menu for answering in response to said notification message.

6. The system for providing a stress-free environment according to claim 5, wherein said user may redirect said incoming telephone call to a voice mailbox of said user in response to a selection of voice mailbox option from said menu for answering.

7. The system for providing a stress-free environment according to claim 5, wherein said user may direct a response message configured to notify a caller that said incoming telephone will be answered in response to a selection of a time extension option from said menu for answering.

8. A method of providing a reduced-stress environment said method comprising:
intercepting an incoming telephone call for a user prior to ringing of said incoming telephone call by a telecommunication interface;
sending a notification message to said user through a wireless transceiver of said telecommunication interface;
indicating to said user of said incoming telephone call in response to said notification message; and
providing a caller a menu for contacting said user, said menu for contacting configured to provide audio options for contacting said user.

9. The method of providing a reduced-stress environment according to claim 8, further comprising:
redirecting said incoming telephone call to a facsimile processing module of said telecommunication interface in response to a selection of a facsimile option from said menu for contacting by said caller.

10. The method of providing a reduced-stress environment according to claim 8, further comprising:
redirecting said incoming telephone call to a telephone answering device processing module of said telecommunication interface in response to a selection of a telephone answering device option from said menu for contacting by said caller.

11. The method of providing a reduced-stress environment according to claim 8, further comprising:
receiving said notification message at a portable notifier of said user; and
providing said user a menu for answering on a display of said portable notifier.

12. The method of providing a reduced-stress environment according to claim 11, further comprising:

transmitting a response message configured to redirect said incoming telephone call to a telephone answering device processing module of said telecommunication interface in response to a selection of a voice mailbox option from said menu for answering by said user.

13. The method of providing a stress environment according to claim 11, further comprising:

transmitting a response message configured to generate a vocal cue to inform said caller that said user will respond in response to a selection of a time extension option from said menu for answering.

14. A system for providing a reduced-stress environment, said system comprising:

means for intercepting an incoming telephone call for a user prior to ringing of said incoming telephone call;

means for sending a notification message to said user;

means for indicating to said user of said incoming telephone call in response to said notification message; and means for providing a caller a menu for contacting said user, said menu for contacting providing audio options for contacting said user.

15. The system for providing a reduced-stress environment according to claim 14, further comprising:

means for redirecting said incoming telephone call to a facsimile processing module in response to a selection of a facsimile option from said menu for contacting by said caller.

16. The system for providing a reduced-stress environment according to claim 14, further comprising:

means for redirecting said incoming telephone call to a telephone answering device processing module in response to a selection of a telephone answering device option from said menu for contacting by said caller.

17. The system for providing a reduced-stress environment according to claim 14, further comprising:

means for receiving said notification message; and means for providing said user a menu for answering.

18. The system for providing a reduced-stress environment according to claim 17, further comprising:

means for transmitting a response message for redirecting said incoming telephone call to a telephone answering device processing module in response to a selection of a voice mailbox option from said menu for answering by said user.

19. The system for providing a stress environment according to claim 17, further comprising:

means for transmitting a response message for generating a vocal cue to inform said caller that said user will respond in response to a selection of a time extension option from said menu for answering.

20. The system of claim 14, wherein said means for intercepting, said means for sending, said means for indicating, and said means for providing comprise devices of a computer system.

21. The system of claim 14, wherein said means for intercepting, said means for sending, said means for indicating, and said means for providing comprise computer readable instructions recorded on a computer readable medium.

* * * * *